US008678232B2

(12) United States Patent
Mockus et al.

(10) Patent No.: US 8,678,232 B2
(45) Date of Patent: Mar. 25, 2014

(54) INVENTORY STORAGE AND DISPENSING MECHANISM

(75) Inventors: Darrell Scott Mockus, San Francisco, CA (US); Mara Clair Segal, San Francisco, CA (US)

(73) Assignee: Utique, Inc., Menlo Park, CA (US)

( * ) Notice: Subject to any disclaimer, the term of this patent is extended or adjusted under 35 U.S.C. 154(b) by 188 days.

(21) Appl. No.: 13/271,061

(22) Filed: Oct. 11, 2011

(65) Prior Publication Data

US 2012/0123587 A1 May 17, 2012

Related U.S. Application Data

(63) Continuation-in-part of application No. 12/806,862, filed on Aug. 23, 2010, now Pat. No. 8,392,019.

(60) Provisional application No. 61/237,604, filed on Aug. 27, 2009, provisional application No. 61/391,956, filed on Oct. 11, 2010.

(51) Int. Cl.
*B65G 59/00* (2006.01)

(52) U.S. Cl.
USPC ........... 221/218; 221/217; 221/253; 221/119; 198/698

(58) Field of Classification Search
USPC ............... 221/217, 218, 253, 119; 198/690.2, 198/697, 699, 728
See application file for complete search history.

(56) References Cited

U.S. PATENT DOCUMENTS 3,263,857 A * 8/1966 Krakauer et al. ............... 221/85
3,759,417 A * 9/1973 Armstrong et al. ............. 221/85
4,252,250 A * 2/1981 Toth ................................ 221/13
4,273,234 A * 6/1981 Bourgeois .................. 198/347.3
4,832,183 A * 5/1989 Lapeyre ......................... 198/699
5,025,950 A 6/1991 Trouteaud et al.
5,509,573 A 4/1996 Campoli
5,831,862 A 11/1998 Hetrick et al.
6,199,720 B1 * 3/2001 Rudick et al. ..................... 221/6
6,357,621 B1 * 3/2002 Vidondo ......................... 221/85
6,808,802 B2 * 10/2004 Lynn ............................. 428/332
7,299,576 B2 11/2007 Martin et al.
7,383,099 B2 6/2008 Pollard et al.
7,584,868 B2 9/2009 Bauch et al.
7,819,281 B2 * 10/2010 Busto ............................ 221/120
7,950,817 B2 5/2011 Zulim et al.
8,082,061 B2 12/2011 Segal et al.
2006/0207862 A1 * 9/2006 Costanzo et al. ............. 198/698
2010/0103131 A1 4/2010 Segal et al.
2010/0262282 A1 10/2010 Segal et al.
2011/0054673 A1 3/2011 Segal et al.

* cited by examiner

*Primary Examiner* — Timothy Waggoner
(74) *Attorney, Agent, or Firm* — Kenneth S. Roberts; One LLP

(57) ABSTRACT

A vending arrangement for computerized vending machines, retail displays, automated retail stores, utilizes a centralized, robotic gantry associated with companion modules for vending selectable products. The modularized design enables deployment of half-sized or full-sized machines. The robotic gantry is deployed in a centralized module disposed adjacent display and inventory modules. The inventory modules can be fitted to both gantry sides, and doors can be fitted to the gantry front or rear. The gantry comprises an internal, vertically displaceable elevator utilizing a central conveyor for laterally, horizontally moving selected items from associated display and inventory positions to a vending position. The inventory modules comprise dispensing modules adjustably configurable to adjust the storage density of items to be vended. Computerized software enables the display and vending functions, and controls movement of the gantry elevator and dispenser module conveyor to dispense products from twin sides of the gantry by controlling the gantry conveyor.

14 Claims, 20 Drawing Sheets

INVENTORY STORAGE AND DISPENSING MECHANISM

CROSS-REFERENCE TO RELATED APPLICATION

This application is a continuation-in-part of U.S. application Ser. No. 12/806,862, filed Aug. 23, 2010, now U.S. Pat. No. 8,392,019 and entitled "Modular Vending With Centralized Robotic Gantry," which claims the benefit of U.S. Provisional Application Ser. No. 61/237,604, filed Aug. 27, 2009, which applications are incorporated herein by reference. This application also claims the benefit of U.S. Provisional Application Ser. No. 61/391,956, filed Oct. 11, 2010, and entitled "Inventory Storage and Dispensing Mechanism", which is incorporated herein by reference.

FIELD

The present system relates generally to automated and modularized vending machines that can be custom deployed in diverse configurations. More specifically, the present system relates to automated vending systems utilizing improved inventory storage and dispensing modules that can be assembled and configured by hand (without tools) and on-site, to support diverse product ranges, including small product samples and large, odd-sized, odd-shaped, light and heavy items, with components linked together via a virtual integrated network.

BACKGROUND

Numerous vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or PCs and virtual interfaces. These new vending platforms have emerged in the marketplace under the descriptions such as "automated retail," "interactive retail,"and/or "interactive retail displays." Such vending machines may be deployed within a variety of commercial or public settings.

In the vending arts, machines historically have a similar design and orientation that make it difficult or impossible to change machine sizes and configurations, inventory storage sizes and product form factors without rebuilding or redesigning the machine, or components contained therein. Typically machines are "one size fits all" or are customized for a fixed set of product sizes and dimensions. In other words, they are designed to a limiting group of specifications and lack the flexibility and re-configurability to accommodate drastic changes in inventory form factors, or a wide universe of products including very small thin items, or items with variable surfaces (protruding, bulging zones, irregular forms) without secondary packaging.

There are some models of traditional vending machines that have some flexibility to support the changing of inventory to different sized items, but they have limits when it comes to non-square or non-rectangle products, thin products or those that are much greater in one size dimension versus the others. In addition these predecessor systems generally allow objects to be dispensed in only 1-2 orientations (right side up, or upside down) limiting the capability to stock inventory and inventory shelves with maximum efficiency.

It is thus desirable to provide a method and mechanism that enables a wide range of inventory to be dispensed to a user with a common end dispensing system. It is also desirable to be able to reconfigure these inventory and storage components in the field in a short period of time limiting machine downtime.

SUMMARY

The present system consists of a number of slats that make up a conveyor of any size, a number of dividers suitable to contain what is being dispensed, a housing, motor, pulleys, gears and a drive belt. In a preferred configuration, numerous inventory modules of various configurations are installed in a series of physical merchandise displays, promotional/digital signage, automated mechanical/dispensing, and/or transactional modules that can be assembled and configured to create an automated retail store, vending unit, or interactive retail display of any size and link together via a virtual integrated network. The present system allows for a highly customizable vending system that can accommodate a wide array of items all utilizing a common inventory storage and dispensing model design.

In accordance with one aspect of the present system, the design utilizes common inexpensive conveyor pieces (slats), dividers, gears, motors, pulleys, belts and fasteners to adjust to a wide range of configurations.

In accordance with another aspect of the present system, the conveyor slats used to form the conveyor can be created in any length.

In accordance with another aspect of the present system, the dividers can be placed at any distance apart within the constraints of one divider per slat and no greater than the entire length of the conveyor.

In accordance with another aspect of the present system, housings can be created to hold and contain as many conveyors as needed to hold items designated for dispensing.

In accordance with another aspect of the present system, housings can vary in density and accommodate as many levels as can fit within the unit's enclosure.

In accordance with another aspect of the present system, a simple plug-in relationship between conveyor parts is established for reconfiguration by hand versus a tool.

In accordance with another aspect of the present system, a unique forked ramp assists the transfer of items from the inventory storage mechanism to a collection or delivery area. This forked ramp reduces errors in product transfer by matching the angle of the ramp with the product divider. This mechanism allows dispensing items to smoothly transfer from a horizontal to an angled surface.

In accordance with another aspect of the present system, an inexpensive universal system of inventory parts has been developed to work in a modular configuration to assemble an inventory system.

The present system and design improves the efficiency of dispensing items by allowing a single design consisting of common parts to accommodate a wide range of product sizes and form factors. It also improves the reliability of dispensing items by accommodating for human error in stocking with mechanical sensors to deal with incorrectly spaced dividers and housing walls to contain items that may shift in position. Inventory storage efficiency is also improved by enabling items to be oriented in multiple directions versus just upright or inverted. This system and design cuts down on excess packaging waste by eliminating the need to repackage most odd-sized items.

The present system and design gives greater flexibility to the merchandising and storage capability of an automated retail machine, enabling a range of merchandise and product storage density to occur within the confines of an existing enclosure. Examples of this could be a machine stocked full of sample sizes vs. full sizes, or a mixture of products that may change frequently. The inventory system is able to accommodate these reconfigurations without any tools, re-engineering, or significant reprogramming of the system. The shelves are able to communicate their location by where the data and power connection is made. As the shelves are inserted into a rack, they make a power and data connection at that level. Depending on where this connection is made, the application can recognize and note the location. A series of connection points exist for possible shelve locations.

The present system provides a common inventory and storage design that can be configured in the field without additional tools or highly specialized labor. This facet provides a great advantage by decreasing additional materials, labor and the amount of components that need to be manufactured and assembled to create an inventory lane.

This is a pronounced advantage in both machine design and manufacturing given the retail marketplace is dynamic and the machine will be able to inexpensively respond to changing merchandising needs. In addition this is a pronounced advantage in supply chain operations given that more merchandise may be stocked in the machine due to optimization of orientation and density, and flexibility to accommodate multiple rows of popular items. In addition, with this design more merchandise can be accommodated without sacrificing the consumer experience given the inventory system can be housed behind a static product display. In addition, the capability to house more merchandise can decrease fulfillment trips and costs associated. In addition, this is a pronounced advantage in system operations and maintainability by decreasing the amount of specialized labor and tools necessary to reconfigure a machine in the field.

This new inventory storage and dispensing component design increases the flexibility in dispensing capability in product size, shape, and orientation. In addition, it decreases the time needed to reconfigure a system to dispense inventory of a different form factor.

Objects of the present system are to provide a product vending machine, automated retail machine, or self-service machine where items are stored inside a secure area and delivered to a user upon a successful transaction in an automated manner.

A basic object is to provide an improved design for product storage and dispensing that cost effectively increases versatility, efficiency, and reliability of the system while decreasing specialized support or tools to alter. This includes, improved product containment systems to increase product storage capacity, ease and efficiency of product handling, dispensing, structural integrity, modularity, customization, shipping/assembly, access and loading of the machine.

Another basic object of the present system is to provide a more effective and flexible vending machine design that can be adapted for its deployment environment by reusing a common dispensing component.

The present system provides a system and method to efficiently configure and deploy a vending system that accomplishes the following:

a) To provide a system design that can efficiently and effectively dispense a wide range of items (various sizes, shapes and types) in an automated (self-service) platform.
b) To optimize the inventory storage space inside of an automated retail machine, vending machine or other type of self-service machine.
c) To provide a design for a single inventory storage and dispensing system to support a wide range of inventory in a flexible and easily configurable/alterable manner.
d) To provide a cost-effective inventory system design that increases the efficiency of product delivery by opening multiple transaction portals in a machine that utilizes the same centralized mechanism.
e) To provide an inventory system design that can accommodate very thin, standard, odd-shaped and variable sized inventory with high reliability, in variable densities and without secondary packaging.
f) To provide a system design that can optimize inventory storage density by providing the capability for products to be oriented in any way that enables more products to fit into storage based on popularity or business need.
g) To provide an intuitive system design that enables laypeople to reconfigure the inventory system with minimal training and without tools in order to update inventory storage.
h) To provide an inventory system design that increases the amount of flexibility in terms of product form factors and density of certain form factors in response to changing inventory needs in retail.
i) To provide an inexpensive and simplistic inventory system for automated retail by designing a system of common reusable parts.
j) To provide greater reliability in inventory dispensing in automated retail/vending platforms by creating an integrating forked ramp between the inventory and robotics dispenser.
k) To provide a reliable method to dispense a wide array of product samples within a vending or automated retail machine.
l) To provide a flexible inventory system design for automated retail and vending that enables accommodation of a broader range of form factors and to determine the necessary configuration to respond to these form factors of the system once deployed in the field.

These and other objects and advantages of the present system, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1A:
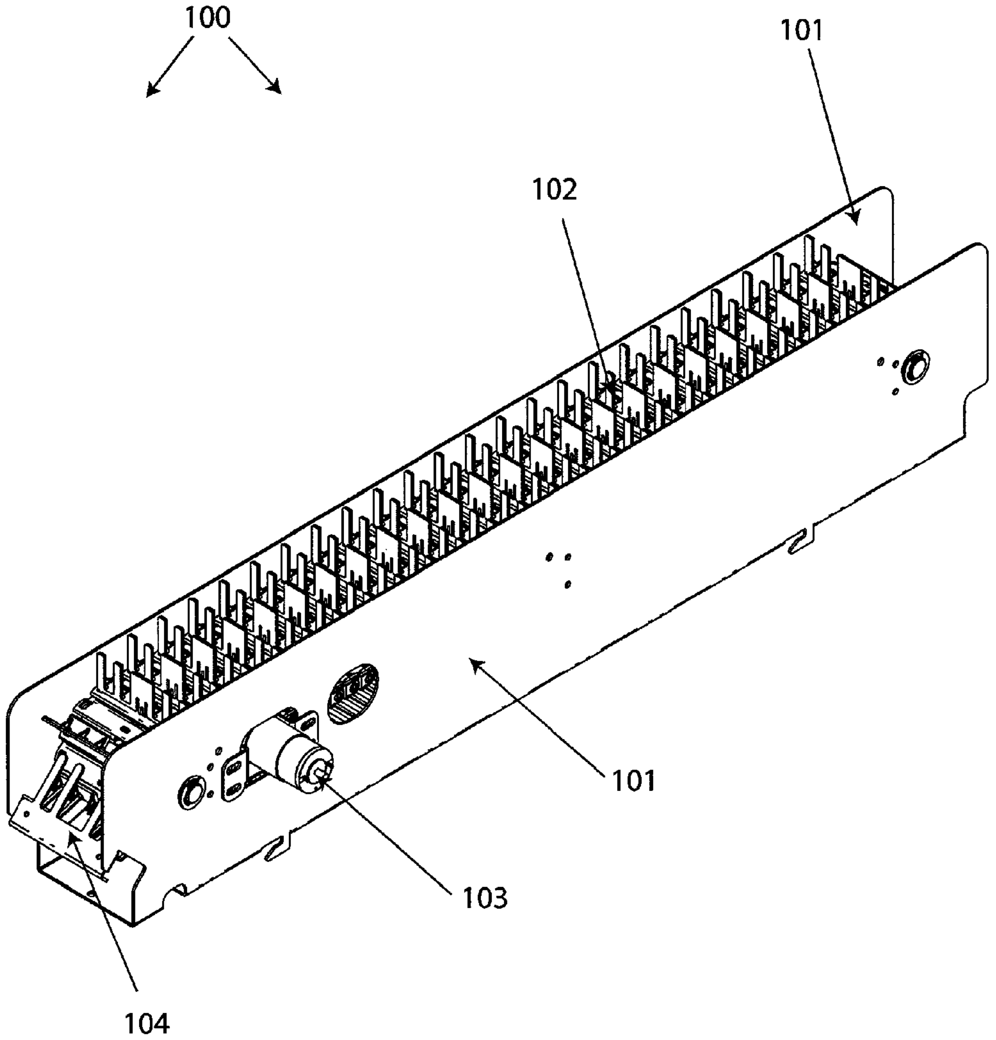
FIG. 1A is an isometric assembly view of a preferred inventory storage and dispensing module used with the vending machines of the present system.

The present system introduces a preferred mechanism for storing and dispensing items in a vending machine or automated retail store. It is preferably used in conjunction with an isolated and centralized robotic dispensing system that can support multiple inventory areas and technologies within those areas. The present system provides the capability to handle inventory of a wide range of form factors in size and shape, in a wide range of configurations. It also provides the ability to easily change the inventory configuration without any special tools quickly, efficiently and inexpensively.

There is great value in having a flexible inventory storage and dispensing mechanism that is easily reconfigured in the field by hand and with a standardized set of inexpensive parts. Some of the value adds include a wider range of products that can be accommodated without system redesign, decrease of development risks, decrease in costs associated with changes in merchandising and far fewer limits to merchandise/merchandising.

In addition, the re-use of components to build and configure the inventory system lowers the amount of pieces that have to be manufactured, distributed and stored. Inventory trays can be configured to fit merchandise of varying form factors and still use common pieces without any special tools or new parts saving cost and configuration time.

Inventory solutions can be updated and reconfigured to work with the central dispensing mechanism without significant customization of the dispensing mechanism, allowing for rapid accommodation of new types and amounts of merchandise for purchase or promotion.

The flexibility in the inventory system also enables products to be oriented in the most efficient direction in order to increase the density of merchandise and optimize efficiency in the supply chain (hypothetically decreasing the amount of stocking trips to the machine given greater capability to accommodate inventory units). In addition, the flexibility of the inventory system permits items of greater popularity to be stocked at a greater density than less popular items.

The importance of increasing the flexibility and field-based re-configurability of the system by a layperson is that the technology is more capable of handling the quick changes that occur in retail merchandising within discretionary, or trend areas. In other words, the inventory system is able to change with retail dynamics and facilitate merchandising the most popular products without limitations imposed by existing inventory systems on the market today.

The inventory system is flexible enough to accommodate a machine full of what has been designated by brand manufacturers as a "product sample or sachet or trial size" of a product. Typically this unit will come in two form factors, a thin foil packaged sachet, or a vial mounted on a small piece of cardboard. Other form factors could include small cylinders or boxes. The inventory system accommodates a wide universe of samples and full size products. The machine could also be reconfigured to accommodate all sample sizes, or all full sizes of the products (as long as the full sizes met the size requirements).

In addition, due to the robust and flexible divider design and connection with the robotics system, items that are odd-sized will typically not necessitate secondary packaging. The system goes further than existing inventory offerings to accommodate odd, bulky, squishy, irregularly surfaced or weighted items without hypothetically requiring secondary packaging (boxing) of these items.

For purposes of disclosure, the following co-pending U.S. utility applications, which are owned by the same assignee as in this case, are hereby incorporated by references, as if fully set forth herein:

(a) Pending U.S. utility application Ser. No. 12/589,277, entitled "Interactive and 3-D Multi-Sensor Touch Selection Interface For an Automated Retail Store, Vending Machine, Digital Sign, or Retail Display," filed Oct. 21, 2009, by coinventors Mara Segal, Darrell Mockus, and Russell Greenberg, that was based upon a prior pending U.S. Provisional Application Ser. No. 61/107,829, filed Oct. 23, 2008, and entitled "Interactive and 3-D Multi-Sensor Touch Selection Interface for an Automated Retail Store, Vending Machine, Digital Sign, or Retail Display";

(b) Pending U.S. utility application Ser. No. 12/589,164, entitled "Vending Machines With Lighting Interactivity And Item-Based Lighting Systems For Retail Display And Automated Retail Stores," filed Oct. 19, 2009 by coinventors Mara Segal, Darrell Mockus, and Russell Greenberg, that was based upon a prior pending U.S. Provisional Application Ser. No. 61/106,952, filed Oct. 20, 2008, and entitled "Lighting Interactivity And Item-Based Lighting Systems In Retail Display, Automated Retail Stores And Vending Machines," by the same coinventors; and, (c) Pending U.S. utility application Ser. No. 12/798,803, entitled "Customer Retention System and Process in a Vending Unit, Retail Display or Automated Retail Store" filed Apr. 12, 2010, by coinventors Mara Segal, Darrell Mockus, and Russell Greenberg, that was based upon a prior pending U.S. Provisional Application Ser. No. 61/168,838 filed Apr. 13, 2009, and entitled "Customer Retention System And Automated Retail Store (Kiosk, Vending Unit, Automated Retail Display And Point-Of-Sale)", by coinventors Darrell Scott Mockus, Mara Segal and Russell Greenberg.

(d) Pending U.S. utility application Ser. No. 12/806,862, entitled "Modular Vending with Centralized Robotic Gantry" filed Aug. 23, 2010, by coinventors Darrell Mockus, Mara Segal, and Russell Greenberg, that was based upon a prior pending U.S. Provisional Application Ser. No. 61/237,604 filed Aug. 27, 2009, and entitled "System And Method For Dispensing Items In An Automated Retail Store Or Other Self-Service System (Including Vending And Self-Service Check-Out Or Kiosk Platforms)": by co-inventors Darrell Scott Mockus, Mara Segal and Russell Greenberg, and priority based on said application is claimed.

With initial reference directed to FIGS. 1A-1I of the appended drawings, a inventory storage and dispensing module 100 is adapted to be integrated into a vending machine or automated retail store.

A housing 101 contains a conveyor 102 that is driven by motor 103. The motor 103 drives the conveyor 102 towards ramp 104 that facilitates the delivery of items stored on the conveyor 102.

Figure 1B:
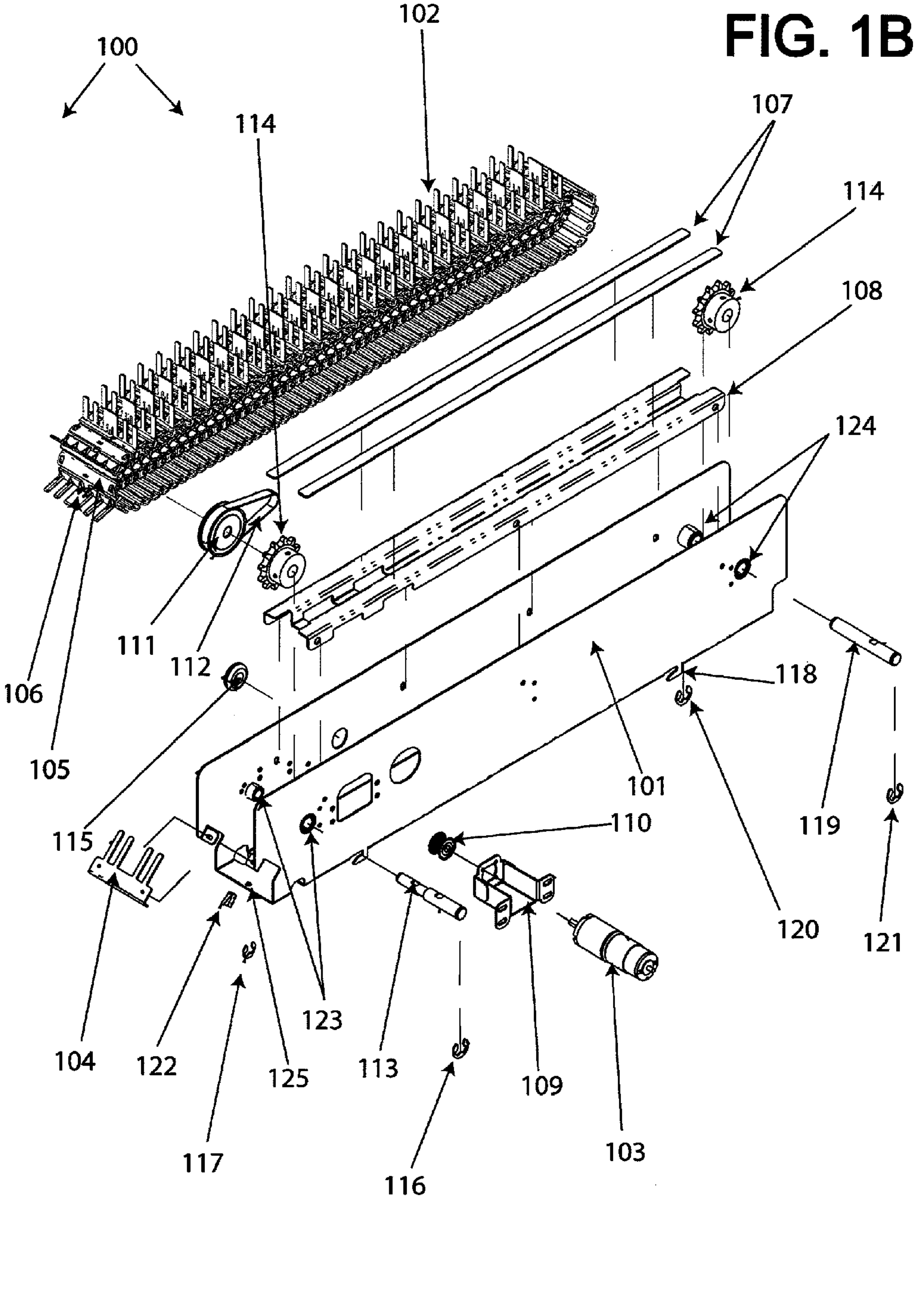
FIG. 1B is an exploded isometric view of the preferred inventory storage and dispensing module displayed in FIG. 1A.

FIG. 1B shows an isometric exploded view of the base inventory module. Conveyor 102 is made up of a series of conveyor pieces 105 (see FIG. 1D) and divider pieces 106 (see FIG. 1E). The conveyor 102 slides on smooth rub strips 107 that reduce friction. These are mounted to conveyor support 108 that sits in housing 101 to provide support for conveyor 102. The conveyor 102 is driven by motor 103 that is mounted in motor bracket 109 and connected directly to pulley 110. This pulley connects to the drive pulley 111 via belt 112. A shaft 113 goes through pulley 111 and drive gear 114 and rides on two press-fit bearings 123. The wiring for the motor 103 and stop switch 122 is routed out the housing through grommet 115 through E clips 116 and 117 secured to the shaft 113. The other end of the conveyor 102 rides on another gear 114. An optional hook 118 that is part of the housing 101 that will insert into a slot on the tray shelf 171 (see FIG. 1I) to secure it. These hooks 118 can be added or removed during manufacturing. Hole 125 provides an additional or alternative way to fasten the dispensing module 100 or lane to a tray. A screw such as a ¼" is inserted through the hole into a threaded component on the tray 171 holding the dispensing module 100 in place. There is an additional hole (not pictured) towards the back of the dispensing module 100 that secures the other end of the dispensing module 100. Shaft 119 is inserted through the gear and rides on two press-ft bearings 124 pressed into housing 101 and secured by E clips 120 and 121. Stop switch 122 is mounted to housing 101.

Figure 1C:
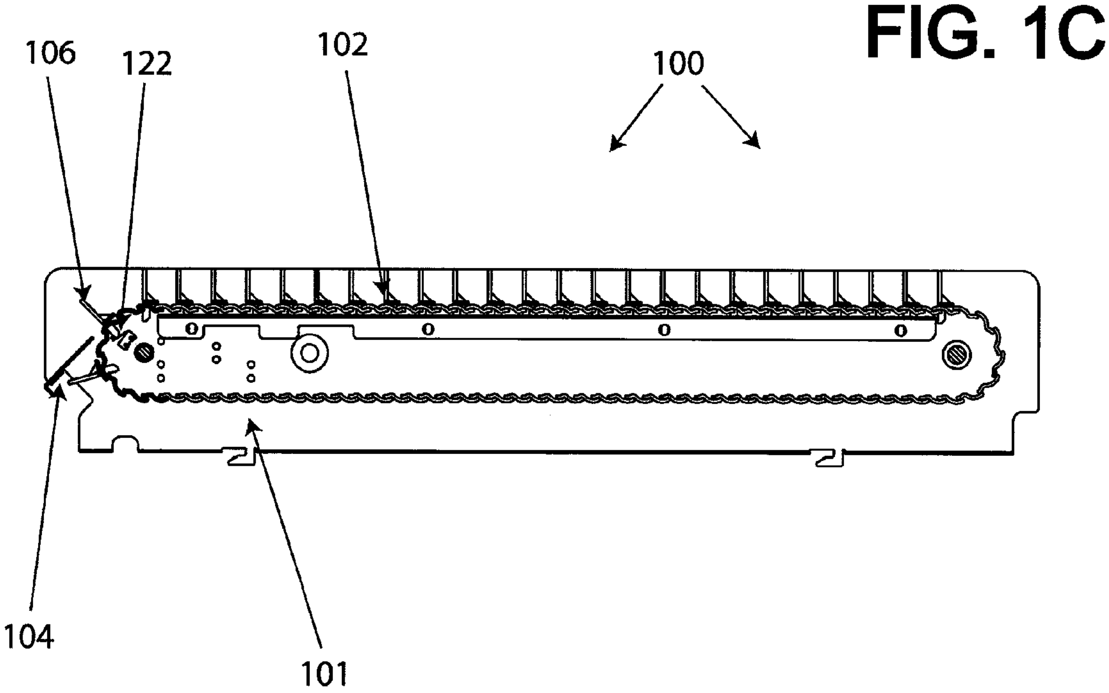
FIG. 1C is a side elevation view of the of the preferred inventory storage and dispensing module displayed in FIG. 1A.

FIG. 1C shows a side view of the base inventory dispensing module 100. In this view, the flag post of part 106 (FIG. 1E) can be seen activating stop switch 122 which sends the signal that the conveyor has advanced enough to properly dispense a product down ramp 104.

Figure 1D:
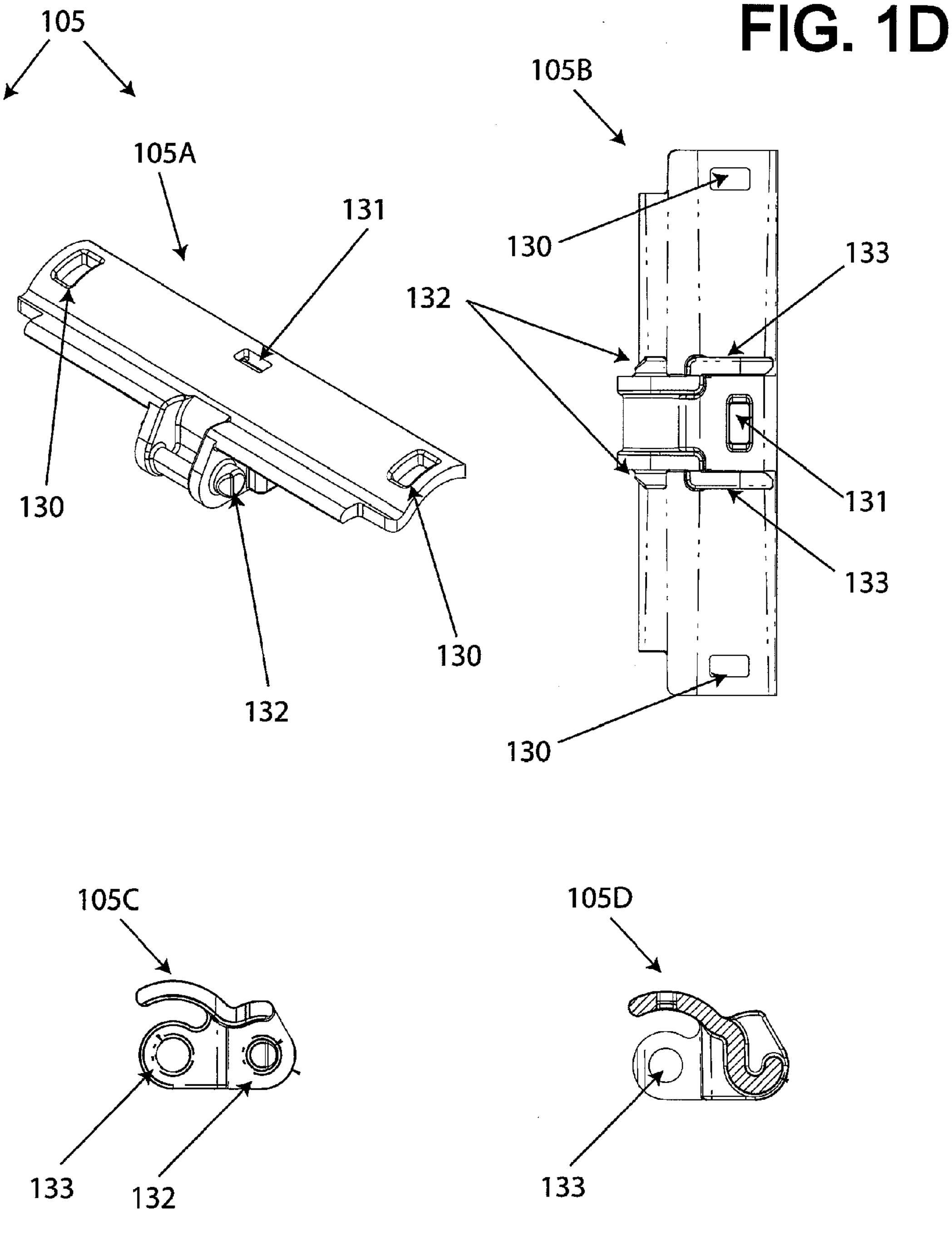
FIG. 1D is an assortment of sectional views that shows enlarged illustrations of the piece that makes up the conveyor depicted in FIGS. 1A and 1B.
Figure 1E:
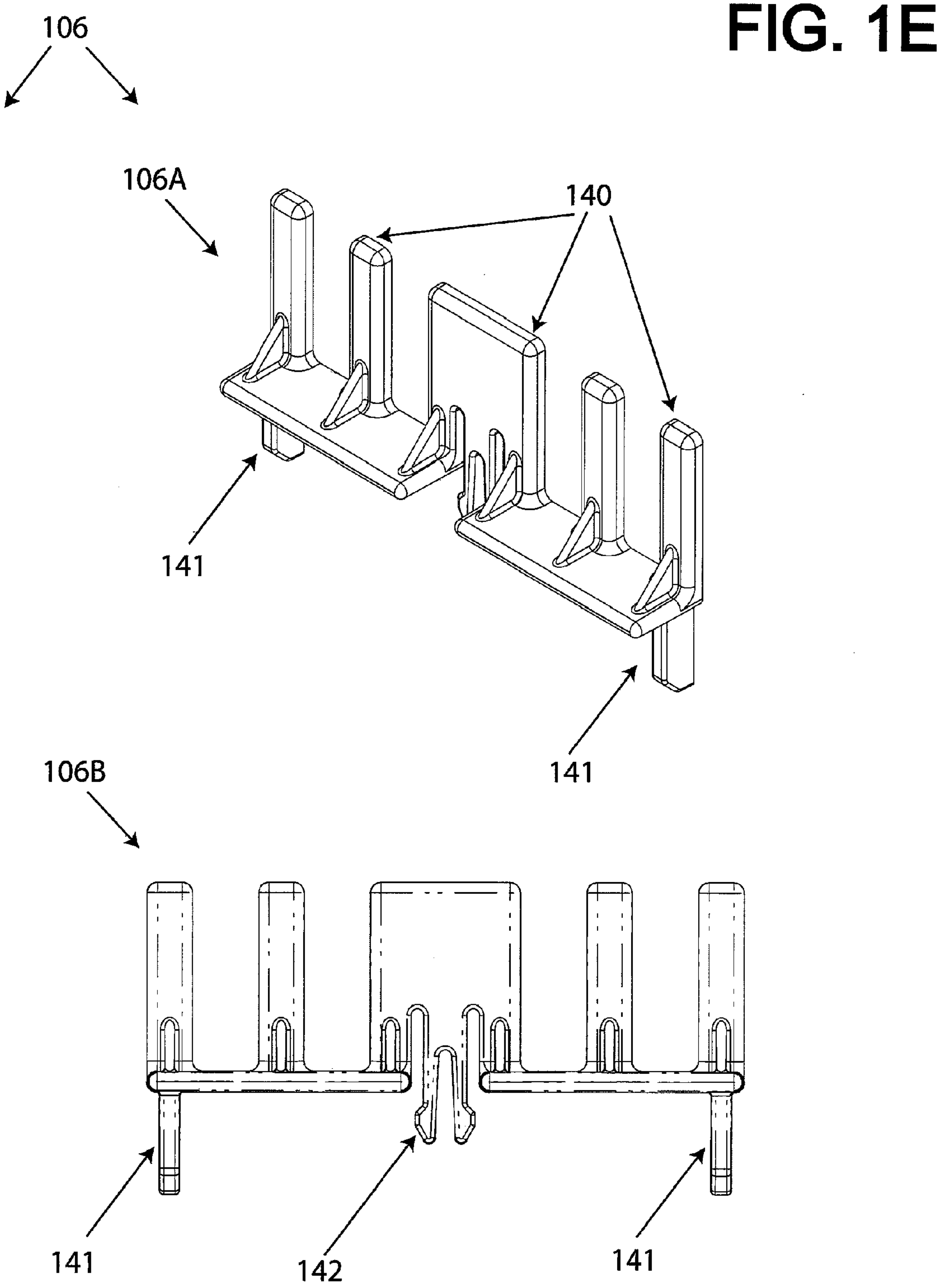
FIG. 1E is an assortment of sectional views that shows enlarged illustrations of the piece that makes up the dividers depicted in FIGS. 1A and 1B.

FIG. 1D shows a number of detailed illustrations of conveyor piece 105 (FIG. 1B) from different angles. 105A is an angled elevation of the conveyor piece. Slots 130 exist at either side of the conveyor piece allowing the stop flag tabs 141 of the divider part 106 (FIG. 1E) to extend though the conveyor piece 105. A slot 131 receives the divider connection tab 142 (FIG. 1E). Male tab 132 and female tabs 133 allow conveyor pieces 105 to be strung together in any length. This flexibility allows the conveyor 102 to grow or contract to any size required. 105B is a bottom elevation of the conveyor piece 105. In this view, the alignment of the male connection tabs 132 can be seen in relation to the female connection tabs 133. 105C shows the side elevation of the conveyor piece 105 and the vertical alignment of male connection tabs 132 with female connection tabs 133. 105D shows a cross-sectional side view of the conveyor piece 105.

FIG. 1E shows a number of detailed illustrations of divider piece 106 (FIG. 1B) from different angles. The divider piece 106 fits into conveyor piece 105 (FIG. 1D) providing the ability to create a dividing separation at any distance in increments of the conveyor depth. This feature provides great flexibility in adjusting the conveyor 102 on-site in the field to accommodate different inventory. This process requires no tools and can be accomplished while the conveyor is installed in the machine. Fork tabs 140 facilitate the handoff from the conveyor 102 to a receiving area. The fork tabs 140 pass through the ramp 104 (FIGS. 1A and 1B) to provide a smooth item handoff. The motor stop flag tabs 141 fit through slots 130 (FIG. 1D) in the conveyor piece 105. These tabs 141 activate the stop motor switch 122 (FIG. 1C) as they pass over the switch 122. This signals the application that the conveyor 102 has dispensed one item and to stop rotating the motor 103. Connection tab 142 fits into slot 131 in the conveyor piece (FIG. 1D) securing the divider 106 to the conveyor piece 105. The connection tab 142 includes two outwardly biased prongs each with a first ramped surface to introduce the tab 142 into the slot 130 and a second ramped surface to releasably retain the tab 142 in the slot 13. The second ramped surface is preferably configured at a steeper angle to the longitude axis of the tab 142 than the first ramped surface.

Figure 1F:
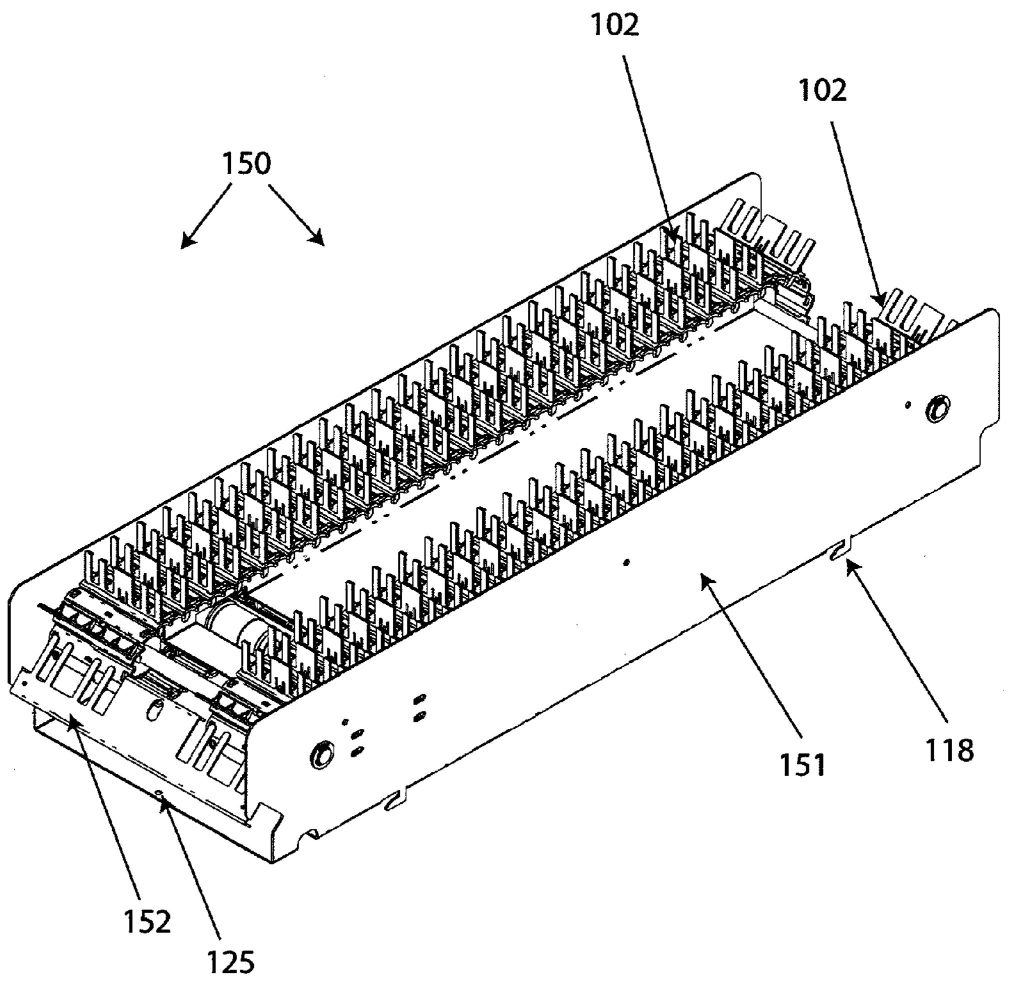
FIG. 1F is an isometric assembly view of an alternative configuration for an inventory storage and dispensing module used with the vending machines of the present system.

FIG. 1F shows an alternate configuration of the conveyor 102 illustrated in FIGS. 1A through 1E. Here, the majority of the same components are used to create a dispensing module 150 that can hold larger products. By using a different motor bracket 156, axels 154 and 155 and housing 151, the same inventory design can be adjusted to handle items of any size (illustrated in FIG. 1G). Conveyors 102 fit inside a larger housing 151. A wider forked ramp 152 helps guide dispensed products into a collection area.

Figure 1G:
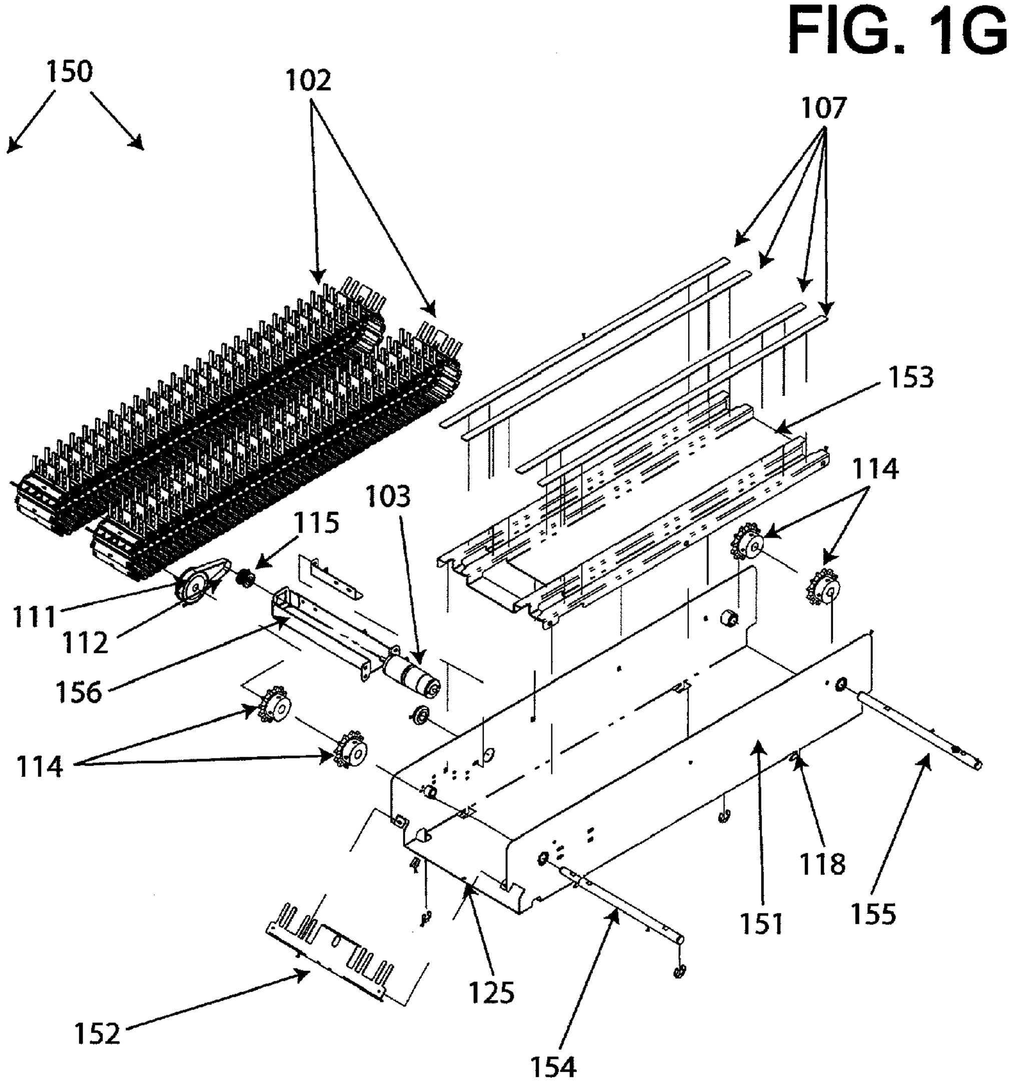
FIG. 1G is an exploded isometric view of the alternative configuration for an inventory storage and dispensing module displayed in FIG. 1F.

FIG. 1G shows an isometric exploded view of the dispensing module 150 in FIG. 1F. This figure illustrates the similar components used and the ones that are modified to fit the larger housing 151. There is a larger mounting bracket 153 that supports the conveyor. A larger shaft 154 houses two gears 114 that drive the conveyors 102. A larger shaft 155 holds the gears 114 that secure the other ends of the conveyors. A longer motor bracket 156 positions the motor 103 at the right position to drive the assembly.

Figure 1H:
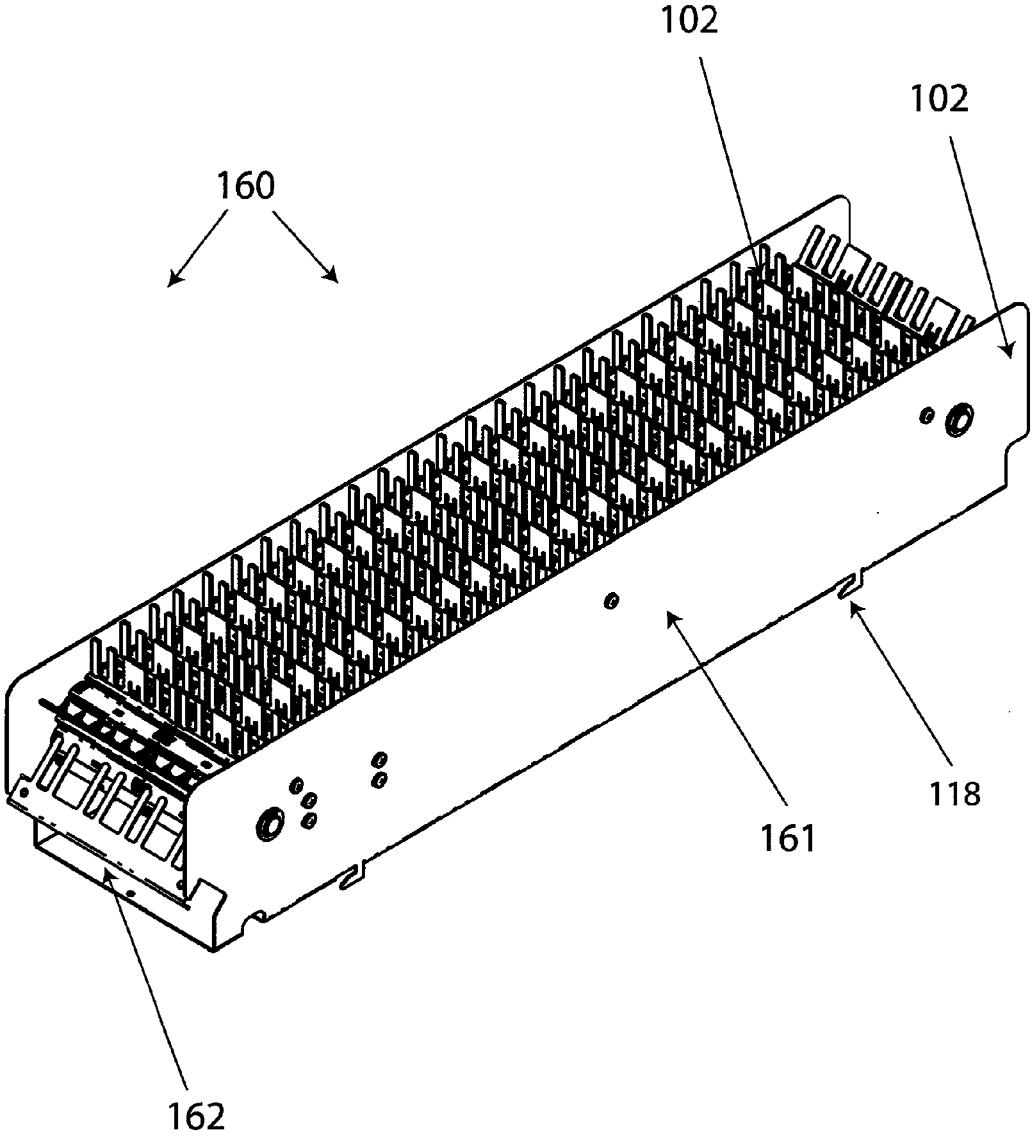
FIG. 1H is an isometric assembly view of an alternative configuration for an inventory storage and dispensing module used with the vending machines of the present system.

FIG. 1H shows another alternate configuration of the inventory assembly. A different housing 161 is used that contain two conveyors 102 that are side by side. A different fork ramp 162 is used that fits the housing.

Figure 1I:
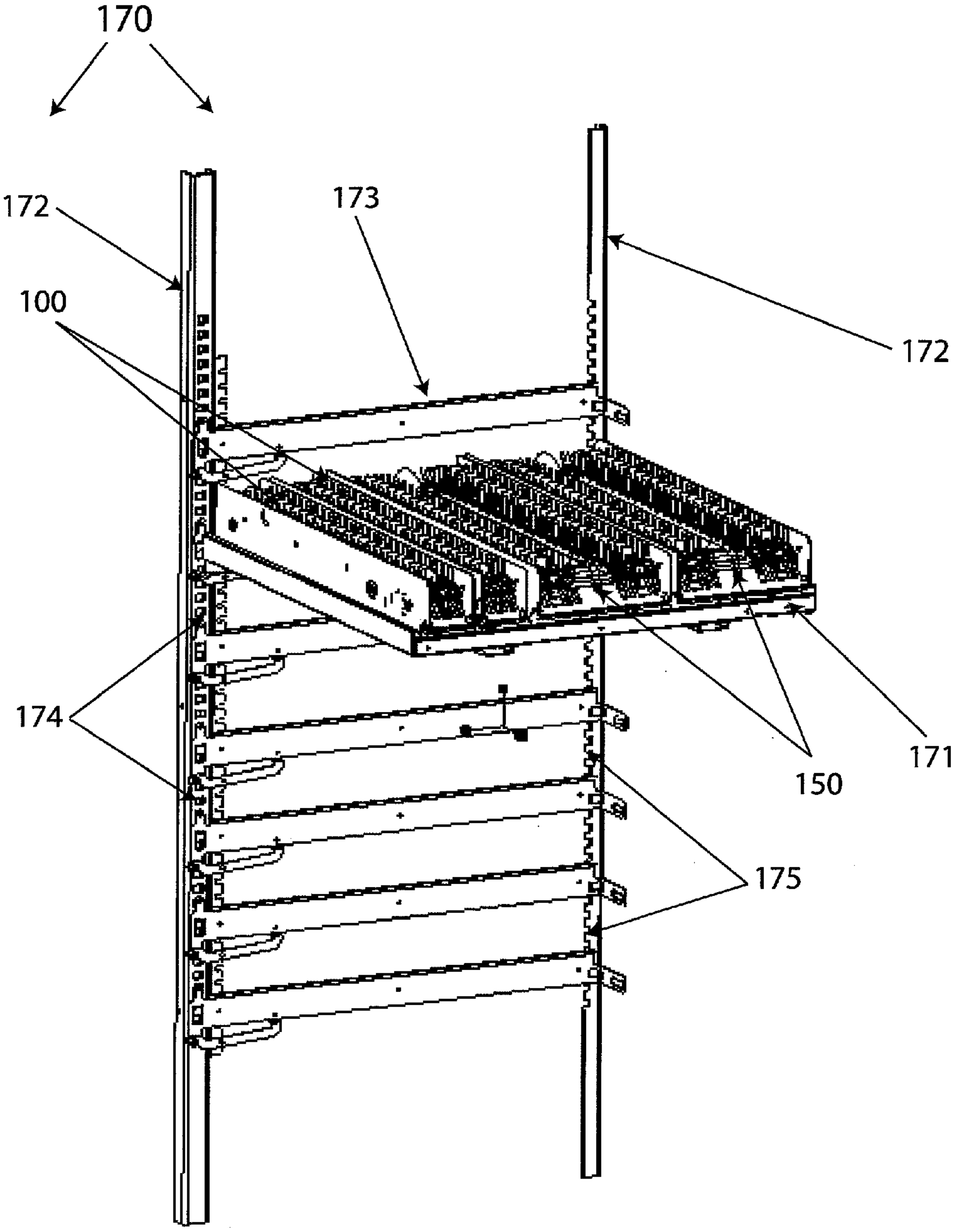
FIG. 1I is an isometric assembly view of various inventory storage and dispensing modules mounted in a rack structure with portions thereof omitted for clarity and brevity.

FIG. 1I shows several conveyor lanes, i.e., dispensing modules 100 and 150 mounted on a shelf or inventory tray 171 in a support structure 170. Conveyor lanes 100 and 150 are shown affixed to an inventory tray 171, which are affixed to C-Channel upright side supports 172. A rail support 173 spans the C-Channel upright side support 172 and fits into holes 174 and notches 175. (rail support on other side not shown). The rail supports 173 can be placed in any of the holes and notches so they shelves can adjust to any height without any tools.

Figure 2A:
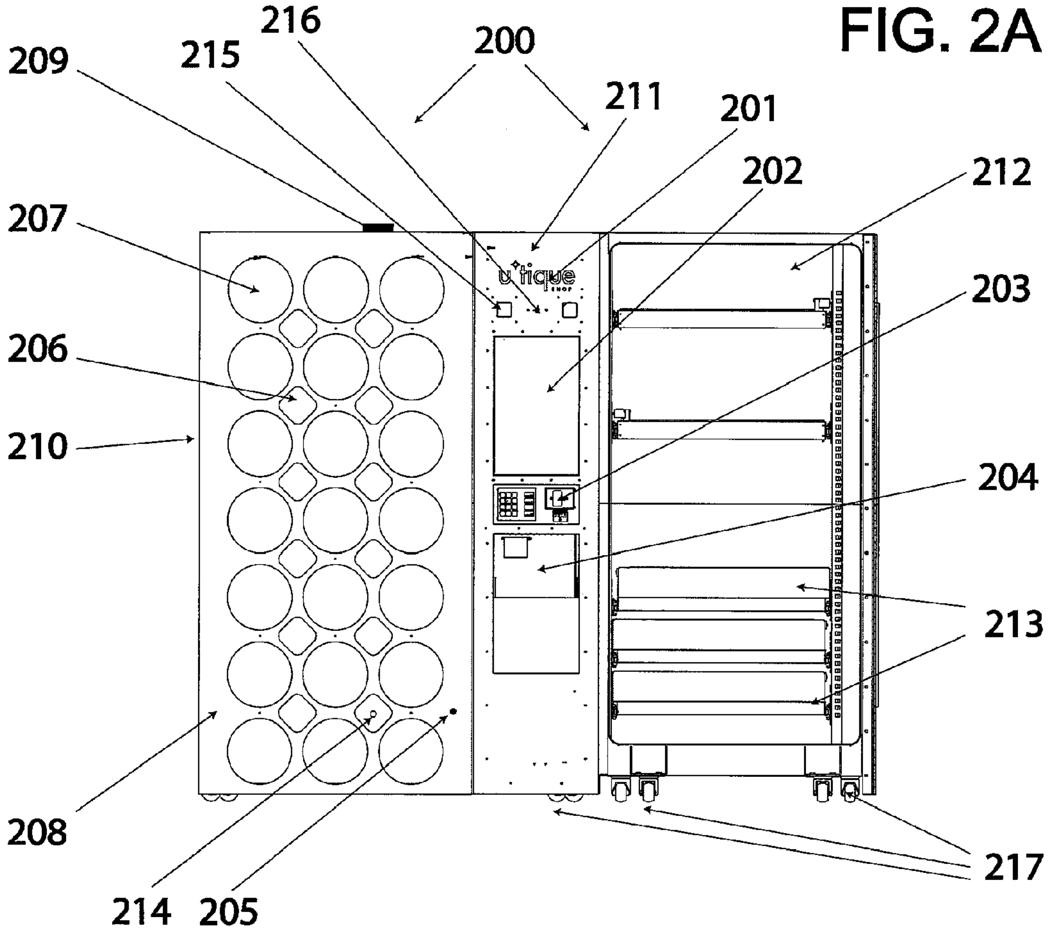
FIG. 2A is front elevational view of a modular vending machine assembly with two connected inventory modules.
Figure 2B:
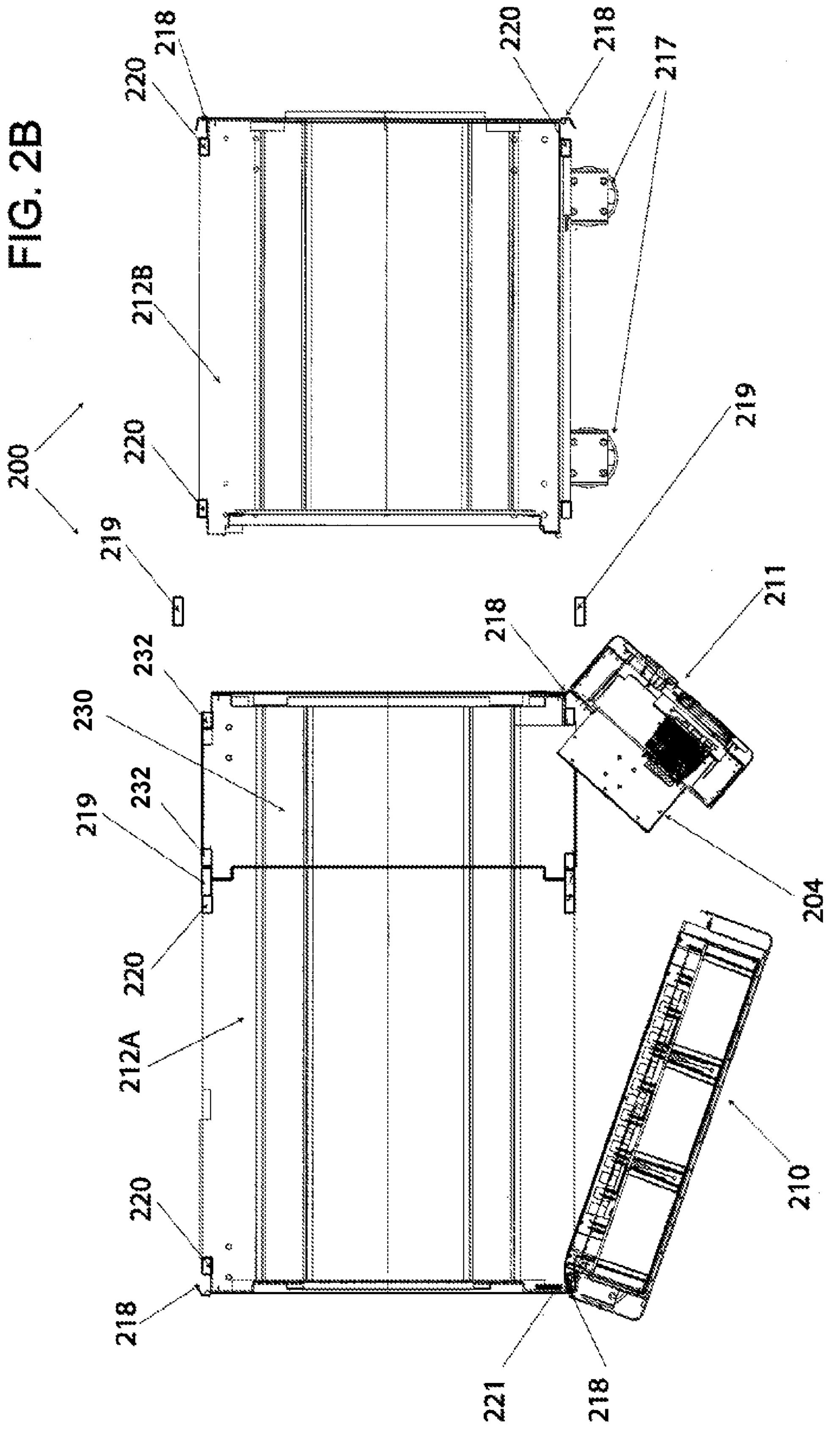
FIG. 2B is a top view of a vending machine assembly illustrating the connection of the various components.

With additional reference directed to FIGS. 2A and 2B, a vending machine constructed in accordance with the best mode of the present system has been generally designated by the reference numeral 200 (FIG. 2A). Much of the hardware details are explained in the aforementioned pending applications that have been incorporated by reference herein. Display module 210 can be attached with a hinge to an inventory area covered by control panel 211, comprised of a rigid upright cabinet, or the module 210 can be mounted to a solid structure as a stand-alone retail display. The display module 210 forms a door hinged to an adjacent cabinet such as an inventory cabinet 212A adjacent gantry 230 that is covered by control panel 211.

A variety of door configurations can be employed. For example, the display modules 210 can be smaller or larger, and they can be located on one or both sides of the control panel 211. The display doors can have multiple square, oval, circular, diamond-shaped, rectangular or any other geometrically shaped windows. Alternatively, the display area can have one large display window with shelves inside.

A customizable, lighted logo area 201 (FIG. 2A) is disposed at the top of control panel 211. Touch screen display 202 is located below area 201. Panel 203 locates the machine payment system, coin acceptor machine or the like. Additionally panel 203 can secure a receipt printer, keypad, headphone jack, fingerprint scanner or other access device. The product retrieval area 204 is disposed beneath the panel 203 in a conventional collection area compartment (not shown). A key lock 205, which can be mechanical or electrical such as a punch-key lock, is disposed beneath the face of the display module 210. One or more motion sensors 214 are disposed within smaller display tubes within the display module 210 interior. A plurality of generally circular product viewing areas 207 and a plurality of generally diamond shaped viewing areas 206 are defined upon the outer the face of the casing 208 that are aligned with internal display tubes behind the product viewing surface areas, though the shape of the viewing areas may alter with various merchandising concepts. However, the convention of framing merchandising offerings is consistent to enable intuitive interfacing whether a physical or virtual representation of the merchandise display. An exterior antenna 209 connects to a wireless modem inside the machine providing connectivity. Inventory shelves 213 may be mounted in the inventory cabinet 212. These inventory shelves 213 may contain any mechanism such as the dispensing modules 100 and 150 discussed above or other conveyors or spiral vending systems as long as they can push a product off the edge of the inventory tray.

Speakers 215 are mounted in the panel 211. A camera 216 capable of capturing video and still images is also mounted in the panel 211. The machine components are set on casters 217 with feet that can be retracted for moving or lowered to position a machine in a deployed location.

FIG. 2B shows a standard configuration of the assembly. The robotized modular gantry 230 is shown connected to an inventory cabinet 212A by bolting the upright C-Channel structures 232 of the modular gantry 230 to upright C-Channel beams 219 which are then affixed to the upright C-Channel structures 220 of the inventory cabinet 212A using additional bolts. Power and controls are routed to the modular gantry 230 via a wiring harness (not depicted) located on the bottom of the modular gantry 230. The CPU and power supplies (detailed in FIGS. 4 and 5) are located in the bottom of the main inventory cabinet that is attached to a modular gantry 230. A second inventory cabinet 212B can also be attached to the other side of the robotized modular gantry 230 using the same method of bolting the upright supports of the inventory cabinets 220 and the upright supports 232 of the gantry 230 to a common upright C-Channel support 219.

Display modules 210 can be attached to the inventory cabinets via a piano hinge 218 running the full height of the door. The necessary electrical and control wiring connects via a wiring harness 221 located on the interior of the inventory cabinet near the hinge connection. These piano style hinges are located on the exterior corners of the inventory cabinets. They are covered with simple metal paneling if they are not in use. The control panel 211 is attached in a similar manner using a piano hinge 218. The necessary electrical and control wiring connect to a wiring harness located in the interior of the control panel 211 (wiring harness not depicted).

Figure 3:
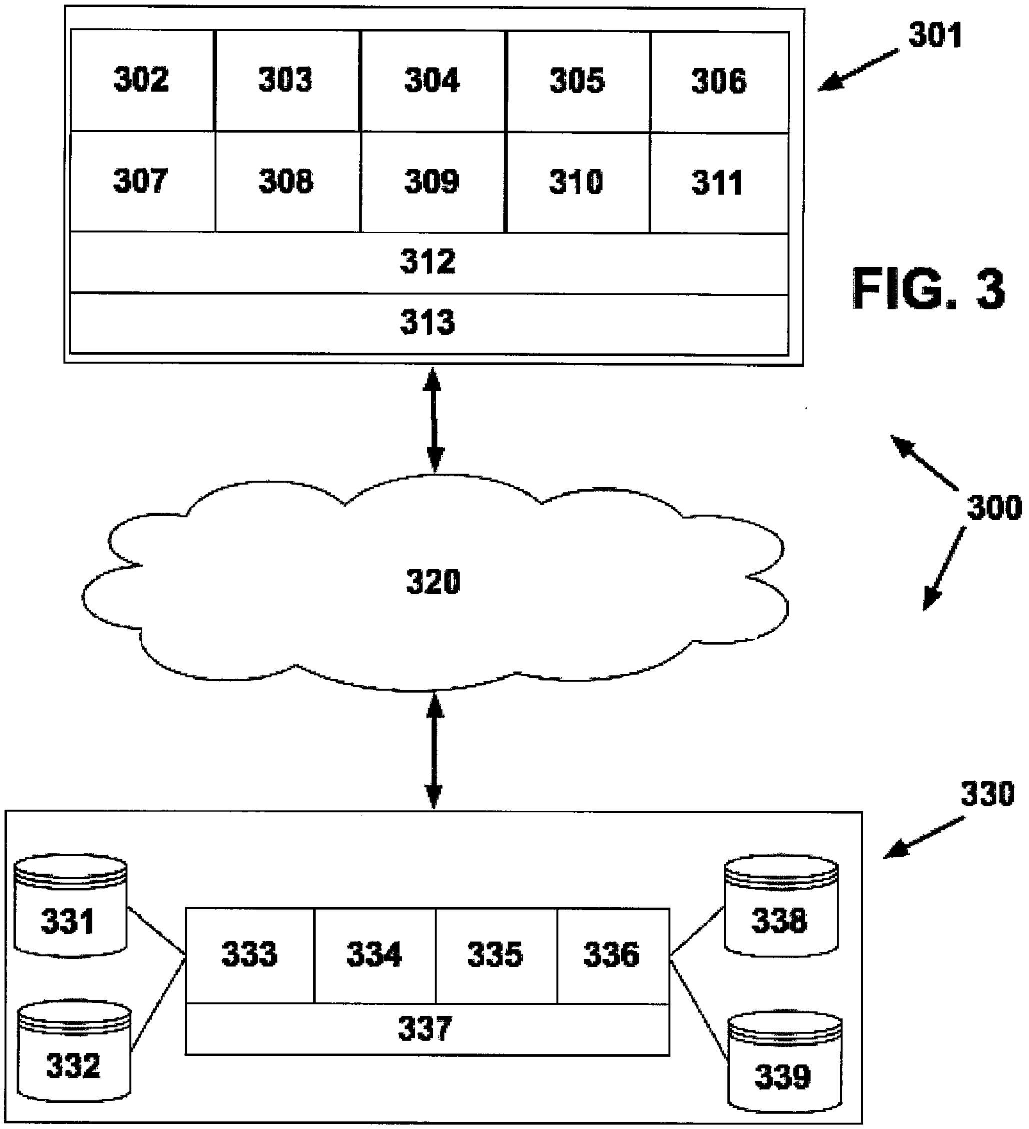
FIG. 3 is a generalized block diagram of the preferred software of the system.

With primary reference directed to FIG. 3, a system consisting of a plurality of automated retail machines connected via a data connection to a centralized, backend operations center system has been designated by the reference numeral 300. At least one automated retail machine 301 is deployed in a physical environment accessible by a consumer who can interact with the machine 301 directly. There can be any number of machines 301, all connected to a single, remote logical operations center 330 via the Internet 320 (or a private network). The operations center 330 can physically reside in a number of locations to meet redundancy and scaling requirements.

The machine software is composed of a number of segments that all work in concert to provide an integrated system. Logical area 302 provides the interface to deal with all of the machine's peripherals such as sensors, keypads, printers and touch screen. Area 303 handles the monitoring of the machine and the notifications the machine provides to administrative users when their attention is required. Area 304 controls the reporting and logging on the machine. All events on the machine are logged and recorded so they can be analyzed later for marketing, sales and troubleshooting analysis. Logical area 305 is responsible for handling the machine's lighting controls.

Logical area 306 is the Inventory Management application. It allows administrative users on location to manage the inventory. This includes restocking the machine with replacement merchandise and changing the merchandise that is sold inside the machine. Administrative users can set the location of stored merchandise and the quantity.

Logical area 307 is the retail store application. It is the primary area that consumers use to interface with the system. Logical area 308 handles the controls required to physically dispense items that are purchased on the machine or physically dispense samples that are requested by a consumer. This area reads the data files that tell the machine how many and what types of inventory systems are connected to the machine. Logical area 309 controls the inventory management system allowing authorized administrative users to configure and manage the physical inventory in the machine. Area 310 controls the payment processing on the machine. It manages the communication from the machine to external systems that authorize and process payments made on the machine. Area 311 is an administrative system that allows an authorized user to manage the content on the machine. This logical area handles the virtual administrative user interface described previously. The content can consist of text, images, video and any configuration files that determine the user's interaction with the machine.

The latter applications interface with the system through an application layer designated in FIG. 3 by the reference numeral 312. This application layer 312 handles the communication between all of these routines and the computer's operating system 313. Layer 312 provides security and lower level messaging capabilities. It also provides stability in monitoring the processes, ensuring they are active and properly functioning. Logical area 331 is the user database repository that resides in the operations center 330. This repository is responsible for storing all of the registered user data that is described in the following figures. It is logically a single repository but physically can represent numerous hardware machines that run an integrated database. The campaign and promotions database and repository 332 stores all of the sales, promotions, specials, campaigns and deals that are executed on the system. Both of these databases directly interface with the real-time management system 333 that handles real-time requests described in later figures. Logical area 334 aggregates data across all of the databases and data repositories to perform inventory and sales reporting. The marketing management system 335 is used by administrative marketing personnel to manage the marketing messaging that occurs on the system; messages are deployed either to machines or to any e-commerce or digital portals. Logical area 336 monitors the deployed machines described in FIG. 2, and provides the tools to observe current status, troubleshoot errors and make remote fixes. Logical area 337 represents the general user interface portion of the system. This area has web tools that allow users to manage their profiles and purchase products, items and services. The content repository database 338 contains all of the content displayed on the machines and in the web portal. Logical area 339 is an aggregate of current and historical sales and usage databases comprised of the logs and reports produced by all of the machines in the field and the web portals.

Figure 4:
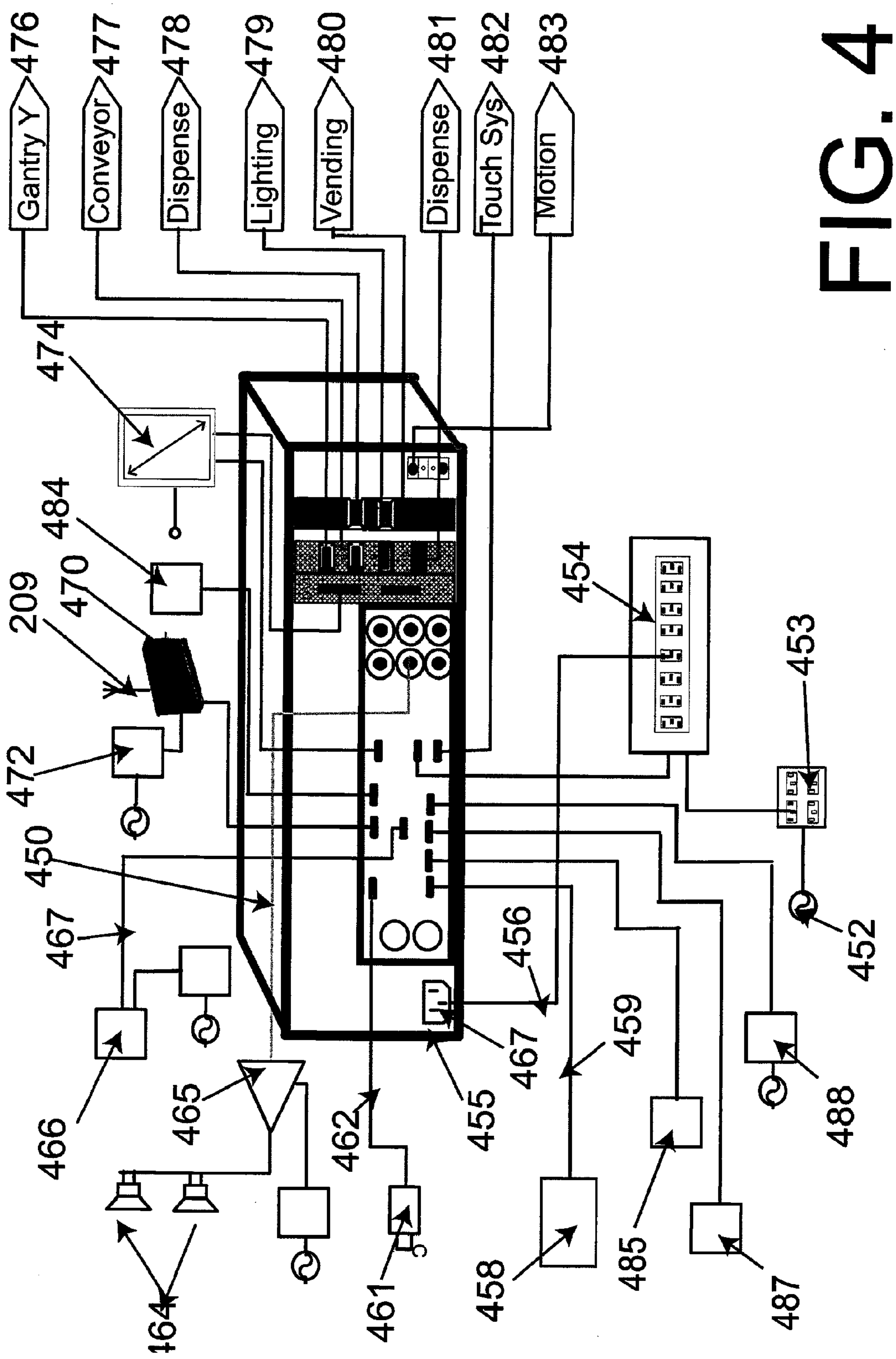
FIG. 4 is a diagrammatic view showing the preferred interconnection of the system computer and communication hardware.
Figure 5:
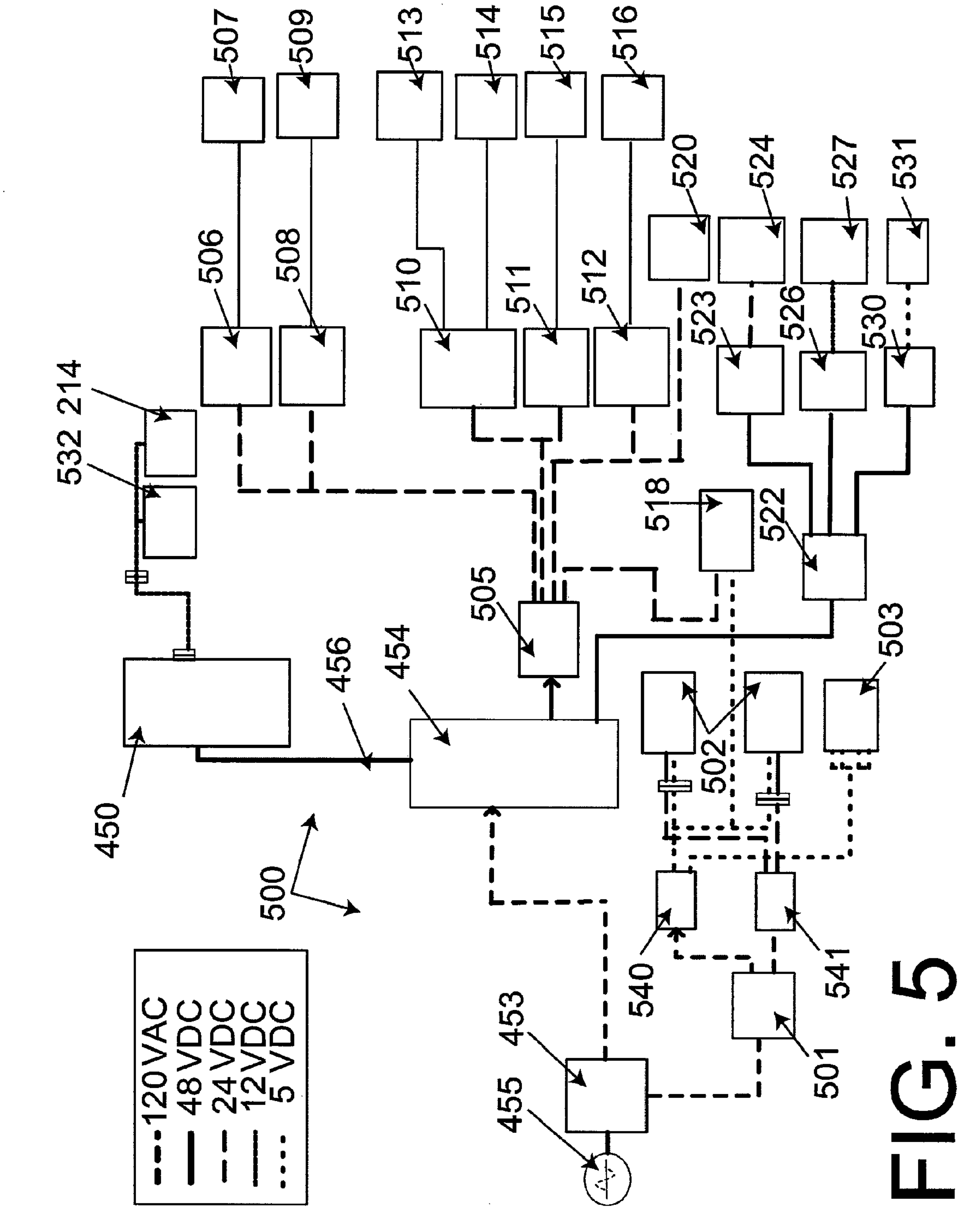
FIG. 5 is a block diagram of the preferred electrical power supply arrangement.

FIGS. 4 and 5 illustrate system wiring to interconnect with a computer 450 such as Advantech's computer engine with a 3 Ghz CPU, 1 GB of RAM memory, 320 GB 7200 RPM hard disk drive, twelve USB ports, at least one Serial port, and an audio output and microphone input. The computer 450 (FIGS. 4, 5) communicates to the lighting system network controller via line 479. Through these connections, the lighting system is integrated to the rest of system. Power is supplied through a plug 452 that powers an outlet 453, which in turn powers a UPS 454 such as TripLite's UPS (900 W, 15 VA) (part number Smart1500LCD) that conditions source power, which is applied to input 455 via line 456. Power is available to accessories through outlet 453 and UPS 454.

Computer 450 (FIG. 4) is interconnected with a conventional payment reader 458 via cabling 459. A pin pad 485 such as Sagem Denmark INT1315-4240 is connected to the CPU 450 via a USB cable. An optional web-accessing camera 461 such as a LOGITECH webcam (part number 961398-0403) connects to computer 450 via cabling 462. Audio is provided by transducers 464 such as Happ Controls four-inch speakers (part number 49-0228-00R) driven by audio amplifier 465 such a Happ Controls Kiosk 2-Channel Amplifier with enclosure (part number 49-5140-100) with approximately 8 Watts RMS per channel at 10% THD with an audio input though a 3.5 mm. stereo jack connected to computer 450. A receipt printer 466 such as Epson's EU-T300 Thermal Printer connects to the computer 450 via cabling 467. The printer is powered by a low voltage power supply such as Epson's 24 VDC power supply (part number PS-180). A remote connection with the computer 450 is enabled by a cellular link 470 such as Multitech's Verizon CDMA cellular modem (part number MTCBA-C-IP-N3-NAM) powered by low voltage power supply 472. The cellular link 470 is connected to an exterior antenna 209. A touch enabled liquid crystal display 474 such as a Ceronix 22" Widescreen (16:10) Touch Monitor for computer operation also connects to computer 450. A Bluetooth adapter 487 such as D-Link's DBT-120 Wireless Bluetooth 2.0 USB Adapter is attached to the CPU allowing it to send and receive Bluetooth communication. A wireless router 488 such as Cisco-Linksys' WRT610N Simultaneous Dual-N Band Wireless Router is connected to the CPU to allow users to connect to the machine via a private network created by the router.

Digital connections are seen on the right of FIG. 4. Gantry-Y (conveyor elevator), stepper motor controller such as the Arcus Advanced Motion Driver+Controller USB/RS485 (part number Arcus ACE-SDE) connection is designated by the reference numerals 476. Connection 477 connects to the conveyor motor controller which can also be something similar to an Arcus Advanced Motion Driver+Controller USB/RS485 (part number Arcus ACE-SDE). Dispenser control output is designated by the reference numeral 478 which operates the product collection wings motor on the gantry 230. The LED lighting control signals communicate through USB cabling to a DMX controller 479 that transmits digital lighting control signals in the RS-485 protocol to the display tube lighting circuit board arrays. An ENTTEC-brand, model DMX USB Pro 512 I/F controller is suitable. Cabling 480 leads to vending control. One or more inventory systems can be connected to the vending control depending on the configuration. Dispenser door control is effectuated via cabling 481. Façade touch sensor inputs arrive through interconnection 482. Motion sensor inputs from a motion sensor such as Digi's Watchport/D (part number Watchport/D 301-1146-01) are received through connection 483. A USB connection connects the product weight sensor 484 such as Sartorius (part number FF03 VF3959) that is located in the collection area to determine the presence of a dispensed item.

FIG. 5 illustrates a detailed power distribution arrangement 500. Because of the various components needed, power has to be converted to different voltages and currents throughout the entire system. The system is wired so that it can run from standard 110 V.A.C. power used in North America. It can be converted to run from 220 V.A.C. for deployments where necessary. Power from line-in 455 supplied through plug 452 (FIG. 4) powers a main junction box 453 with multiple outlets (FIGS. 4, 5) that powers UPS 454 which conditions source power, and outputs to computer 450 line 456. Power is available to accessories through main junction box 453 and Ground-fault current interrupt AC line-in 455. An additional AC outlet strip 501 such as Triplite's six position power strip (part number TLM606NC) powers LED lighting circuits 502 and a touch system 503. Power is first converted to 5 volts to run the lighting board logic using a converter 540. Another converter, 541, converts the AC into 24 Volt power to run the lights and touch system.

An open frame power supply 505 (FIG. 5) provides 24 VDC, 6.3 A, at 150 watts. Power supply 505 powers Y-controller 506 such as the Arcus Advanced Motion Driver+Controller USB/RS485 (part number Arcus ACE-SDE), that connects to Y axis stepper motor 507. A suitable stepper 507 can be a Moons-brand stepper motor (part number Moons P/N 24HS5403-01N). Power supply 505 also connects to a conveyor controller 508, which can be an Arcus-brand Advanced Motion Driver+Controller USB/RS485 (part number Arcus ACE-SDE), that connects to a conveyor stepper 509. A Moons-brand stepper motor (part number Moons P/N 24HS5403-01N) is suitable for stepper 509.

Power supply 505 (FIG. 5) also powers dispenser controller 510, dispenser door control 511, and vending controller 512. Controller 510 powers collection wing motor 514 and door motor 515. Motors 514 and 515 can be Canon-brand DC gear motors (part number 05S026-DG16). Controller 512 operates conveyor motors 516 such as Micro-Drives DC Gear Motor (Part Number M32P0264YSGT4). The logo space 201 (FIG. 2) is illuminated by lighting 518 (FIG. 5) powered by supply 505. Supply 505 also powers LCD touch screen block 520 (FIG. 5) such as a Kristel 22" Widescreen (16:10) LCD Touch Monitor with USB connection for the touch panel. UPS 454 (FIG. 5) also powers an AC outlet strip 522 that in turn powers a receipt printer power supply 523 such as Epson's 24 VDC power supply (part number PS-180) that energizes receipt printer 524 such as Epson's EU-T300 Thermal Printer, an audio power supply that powers audio amplifier 527 such a Happ Controls Kiosk 2-Channel Amplifier with enclosure (part number 49-5140-100), and a low voltage cell modem power supply 530 that runs cellular modem 531 such as Multitech's Verizon CDMA cellular modem (part number MTCBA-C-IP-N3-NAM). A proximity sensor 214 (FIG. 2A) such as a Digi Watchport/D part number 301-1146-01 is connected to the CPU 450. 532 is a door sensor and actuator such as Hamlin's position and movement sensor (part 59125) and actuator (part 57125) which are connected to the CPU 450.

Subroutine 600 (FIG. 6) illustrates the preferred method of initializing the machine and inventory and dispensing system at system runtime. The process begins at step 601 when the system application is launched. Step 602 reads in and parses the lighting XML file 603. The lighting file contains a sequence of lighting sequences to be performed for various user actions on the system such as selecting a product or category, adding to the virtual shopping bag and removing it from the shopping bag. These lighting sequences dictate both the onscreen coloring of products in the virtual display and the lighting of products in the physical display. These values are cached in local memory as an application variable. Step 604 checks if there are any fatal errors. Fatal errors are ones that prevent the system from allowing a user to complete a transaction. All errors are logged using the reporting and logging system 303 (FIG. 3). Non-fatal errors are noted in the log file so they can be examined later to correct the issue. If the error is fatal, the process goes to step 605 where the user is notified of an error and given customer support information and an alert notification is sent out to the notification system 303 (FIG. 3). The system is placed in an idle state where the touch screen will display a message noting that the machine is currently not in service. The system will attempt to recover in step 606 by attempting to start the application process again and reinitialize the system. If there are no fatal errors, the process continues to step 607 that reads in and parses the planogram file 608. The planogram file contains the product identification number, or item identification number, a product name and a Boolean value if it is active or not for each display slot number. These values are cached in local memory as an application variable. Step 609 checks if there are any fatal errors. If there are fatal errors, it routes to step 605, otherwise the process continues at step 610. Step 610 reads in all of the inventory XML files. These files instruct the system on what inventory cabinets are attached to the machine and what inventory is in what inventory slots. Each inventory slot is designated by the cabinet it is located in, the shelf it is on, the size of the inventory slot and the motors that drive the dispensing mechanism. Using this information, the application can determine the shelf location (height). The XML file information is cached and then accessed during product dispensing to guide the robotic gantry elevator to the correct shelf height to collect a product.

The dispensing motor information is used by the dispenser control to turn on the motor that dispenses the product until a mechanical switch is activated determining the product has been dispensed to the gantry elevator. Because of the centralized layout of the robotic gantry, it does not matter which inventory system is connected or even what side from which the product is being dispensed. It only matters what shelf the product is on so the elevator can move to the correct height to collect the product. Step 610 reads in all of the screen templates 611 that determine the layout of the visual selection interface. Step 612 checks if there are any fatal errors. If there are fatal errors, it routes to step 605, otherwise the process continues at step 613. Step 613 reads in all of the screen templates 611 that determine the layout of the user interface and all of the screen asset files 614 associated with the screen templates 611.

These asset files can be images or extended markup files that represent buttons, header banners graphics that fit into header areas, directions or instructions that are displayed in designated areas, image map files that determine which area on an image corresponds represents which area on the physical facade or images representing the physical façade. These assets are cached into local memory in the application. Step 615 checks if there are any fatal errors. If there are fatal errors, it routes to step 605, otherwise the process continues at step 616. Step 616 reads and parses the product catalog files 617. The product catalog stores all of information, graphics, specifications, prices and rich media elements (e.g. video, audio, etc.) for each item or product in the system. Each element is organized according to its identification number. These elements can be stored in a database or organized in a file folder system. These items are cached in application memory. Step 618 checks if there are any fatal errors. If there are fatal errors, it routes to step 605, otherwise the process continues at step 619. Step 619 reads in all of the system audio files 620 and the file that the stores the actions with which each audio file is associated. Audio files can be of any format, compressed or uncompressed such as WAV, AIFF, MPEG, etc. An XML file stores the name of the application event and the sound file name and location. Step 621 checks if there are any fatal errors. If there are fatal errors, it routes to step 905, otherwise the process continues at step 622. Step 622 does a system wide hardware check by communicating with the system peripherals and controllers 302 and 308 (FIG. 3). Step 623 checks if there are any fatal errors. If there are fatal errors, it routes to step 605, otherwise the process continues at step 624. Step 624 launches the application display on the touch screen interface. The system then waits for user input 625.

Subroutine 700 (FIG. 7) illustrates the preferred runtime method the machine uses to dispense items to an end user during a user session. The process begins at step 701 after a user completed a transaction that purchases the merchandise about to be vended. This process assumes that a separate process has already checked that the inventory is available for vending and it has been paid for. The routine is passed a list of items to be dispensed. For items that have multiple quantities, each item is listed as a separate item. Step 702 reads this list into the process memory. Step 703 determines if the dispensing system is busy processing another request. If the dispensing system is busy for any reason, step 704 pings the resource until it is free and then directs the process to step 708 where the first (or next) item in the list is read. Step 705 is a timer that monitors step 704 to determine if the wait for the resource times out to a preset time. If it does time out, the process is considered to have an error and it directs control to step 706 that sends out an alert using the notification system designated by 303 (FIG. 3). Step 707 attempts the recovery of the system by running any preprogrammed diagnostics and self repairing routines that check and restart power and communication links to the system. If the system cannot automatically recover, the machines goes into an idle state and a message is displayed on the main screen indicating the machine is currently out of service preventing users from using the system. If the system resources are free, step 708 reads the next item to be vended from the list and retrieves its associative information into memory. This information was originally loaded into the system as the inventory XML file 611 (FIG. 6) read into memory in step 610. The item, or product id is used to retrieve this information. Information associated with the identification number includes the item's location in the inventory system (shelf height and corresponding elevator position represented as the position the elevator needs to be in to properly collect the dispensed product), the dispensing motors associated with vending the item from the inventory shelf and item details such as its name to prompt the user, and its weight and dimensions which are used in conjunction with the product weight sensor 484 (FIG. 6) to determine a successful vend.

Figure 6:
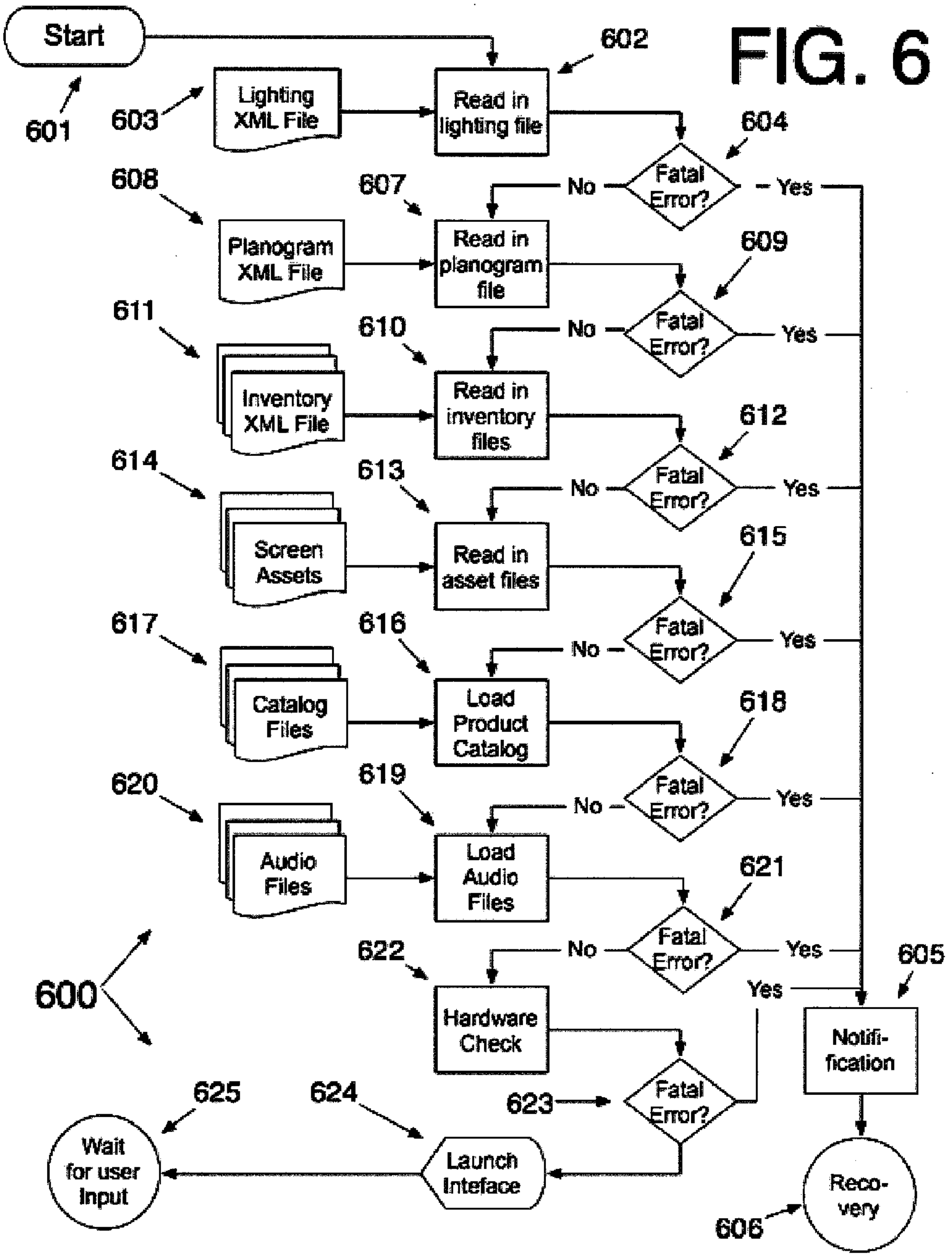
FIG. 6 is a software block diagram of the preferred machine runtime initialization process.
Figure 7:
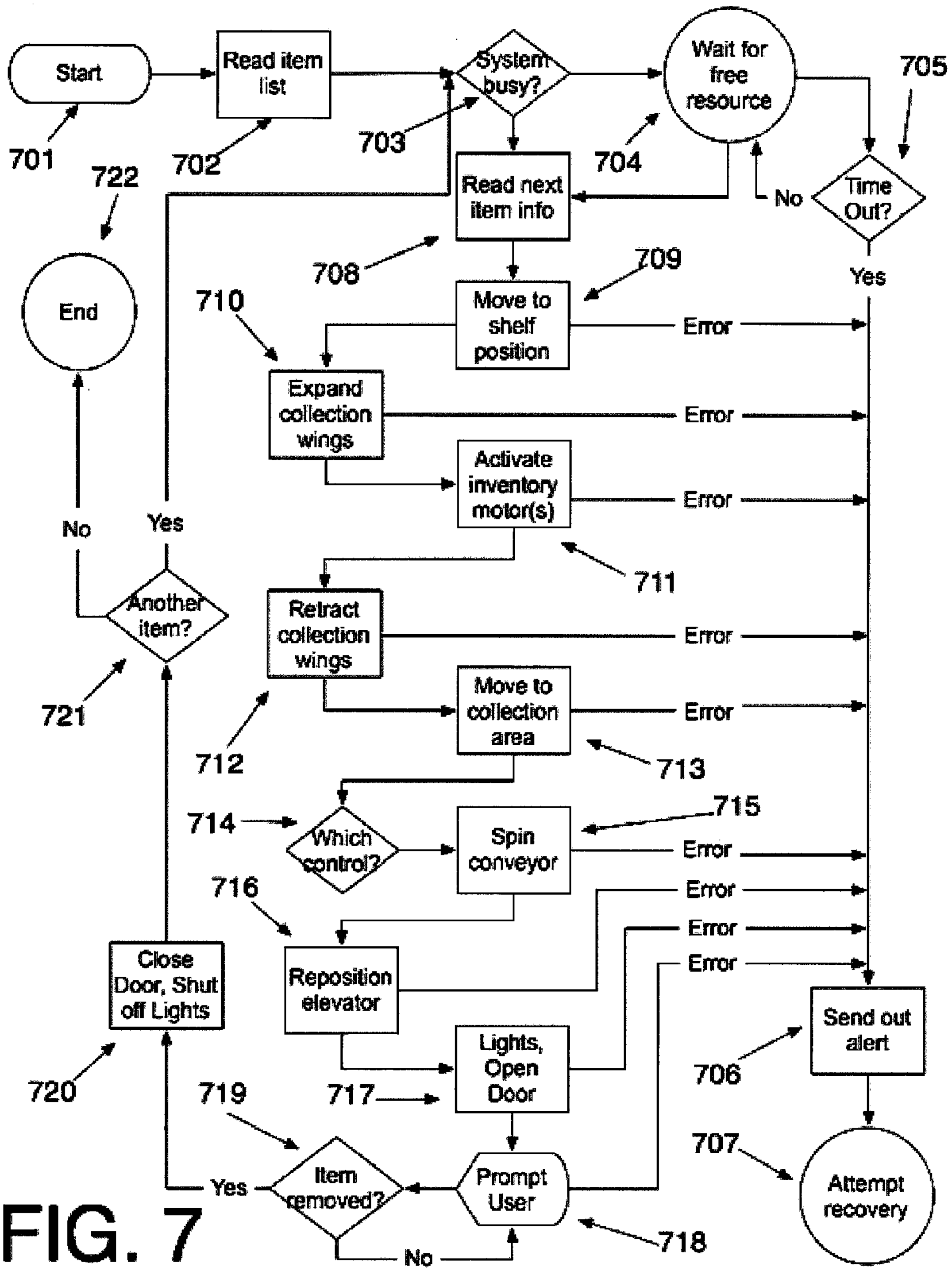
FIG. 7 is a software block diagram of the preferred machine runtime dispensing process.

Step 709 uses this information to move the elevator tray assembly of the gantry 230 to the correct shelf height for the current item being vended. The elevator height is determined by preset position values that tell the stepper motor where to position itself on the vertical aspect of the gantry. The stepper motor has an encoder that communicates with the controller to verify the position. This combination of hardware allows the software to set a height value and have the stepper motor and the stepper controller ensure the correct position is attained. If there is a detectable error with the elevator mechanics, an error message is generated and sent out by step 706. Step 707 will again try to recover if possible. If the elevator assembly reaches the correct height and position as designated by the product information record, the product collection wings are expanded to create an extended landing area that will catch products coming off the inventory trays 213 (FIG. 2A). If an error in this process is detected, an error message is generated and step 706 will send out an alert. Otherwise, if the elevator is in position and the production collection wings are extended, step 711 will use the information retrieved in the product record to activate the motor(s) associated with that item of inventory. A mechanical switch is used to indicate that the motor has revolved enough times to properly dispense the product or item off the shelf at which point it falls on to the product collection wings and into the conveyor. Errors are again detected if present and routed to the notification system in step 706. Step 712 retracts the product collection wings so the elevator can freely move up and down in the dispensing assembly. This step also assists in positioning the product on the conveyor where it can be delivered to the user later in the process. Any detected errors in this step are routed to step 706. If there are no errors, step 713 moved the elevator gantry to the user collection area. The movement of the elevator mechanically opens up the product collection area by activating levers that open the top and back of the area. If no errors are detected, step 714 notes which control activated the dispensing process. This is only relevant when the machine is configured for dual sided vending (see FIGS. 9 and 11). Step 715 then spins the conveyor in the direction of the user that initiated the dispensing process. If no errors were detected, step 716 repositions the elevator that reverses the mechanical operation that opened the back of the collection area and closed it sealing off the internal components of the machine from the user. If no errors were detected, step 717 turns on the lights in the collection area 204 (FIG. 2) and opens the exterior collection area door. Step 718 prompts the user on the screen 202 (FIG. 2A) to collect their product. Step 719 monitors signals from the product weight sensor 484 (FIG. 4) and records the weight and matches it against the product weight information stored in the inventory XML file 611 (FIG. 6). This sensor could also be a motion or light curtain sensor. If the item was not removed for a preset amount of time, the user is prompted again to collect their item in step 718. If user does not collect their product after a set number of attempts, an error is generated. If the sensor determines the user has removed their item, the process continues to step 720 where the exterior door is closed and the product collection area lights are turned off. The system again monitors for any mechanical errors in this process (line to step 706 not shown). Step 721 determines if there are any additional items in the list of items to be vended. If there are additional items to be vended, the process routes back to step 703 where it begins again for the next item. If there are no more items to be vended, the process ends at step 722.

Figure 8:
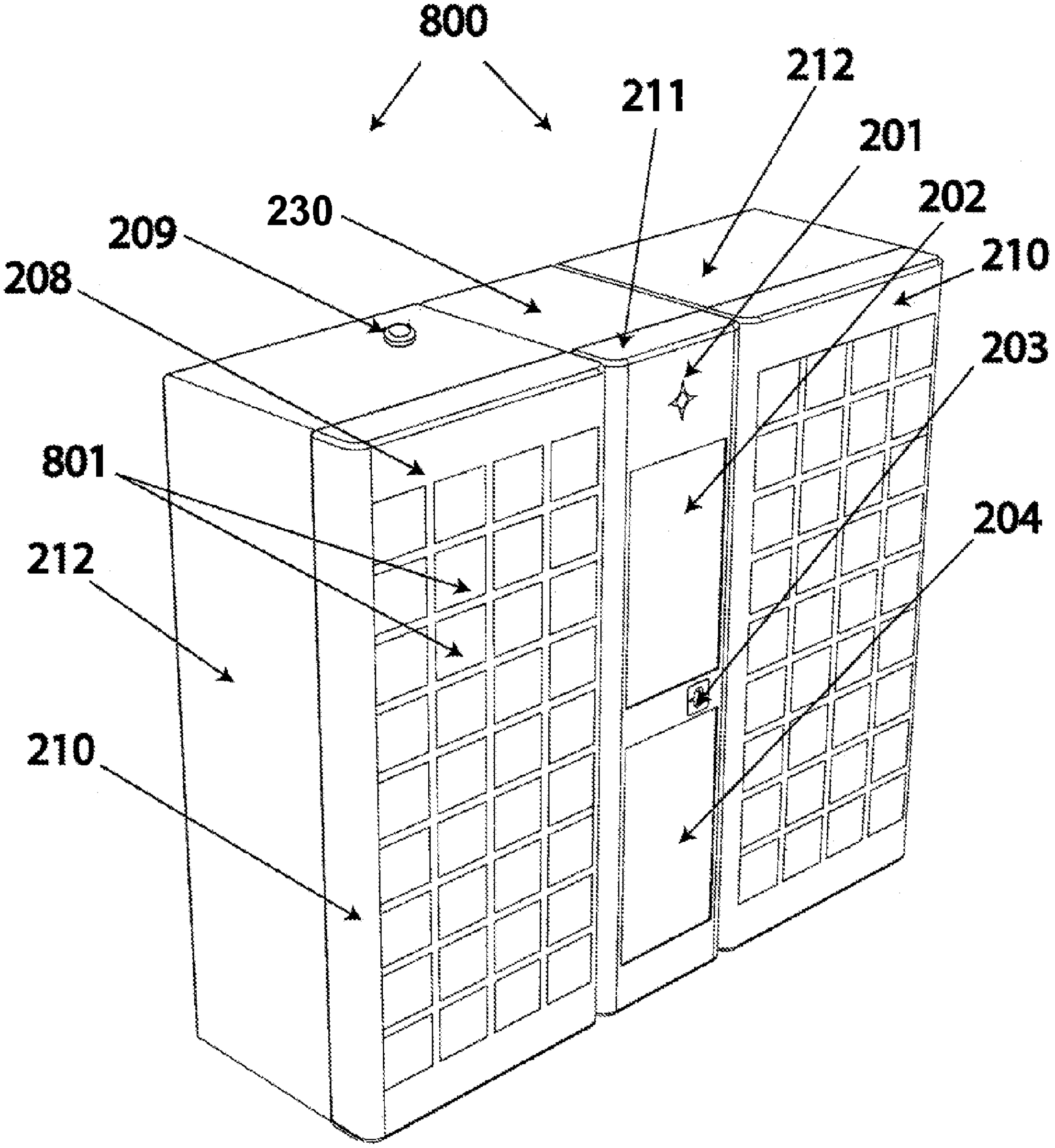
FIG. 8 is an isometric view of an assembled vending machine module with two attached inventory components and an alternative display door design.

With reference directed to FIG. 8, an alternative vending machine 800 constructed in accordance with the best mode of the present system incorporates a variant on the display module designated as 210 in FIG. 2A. In this version the display module has a plurality of generally square product viewing areas 801 that present an alternative display, different from the diamond and circle display windows designated at 206 and 207 respectively in FIG. 2A.

Figure 9:
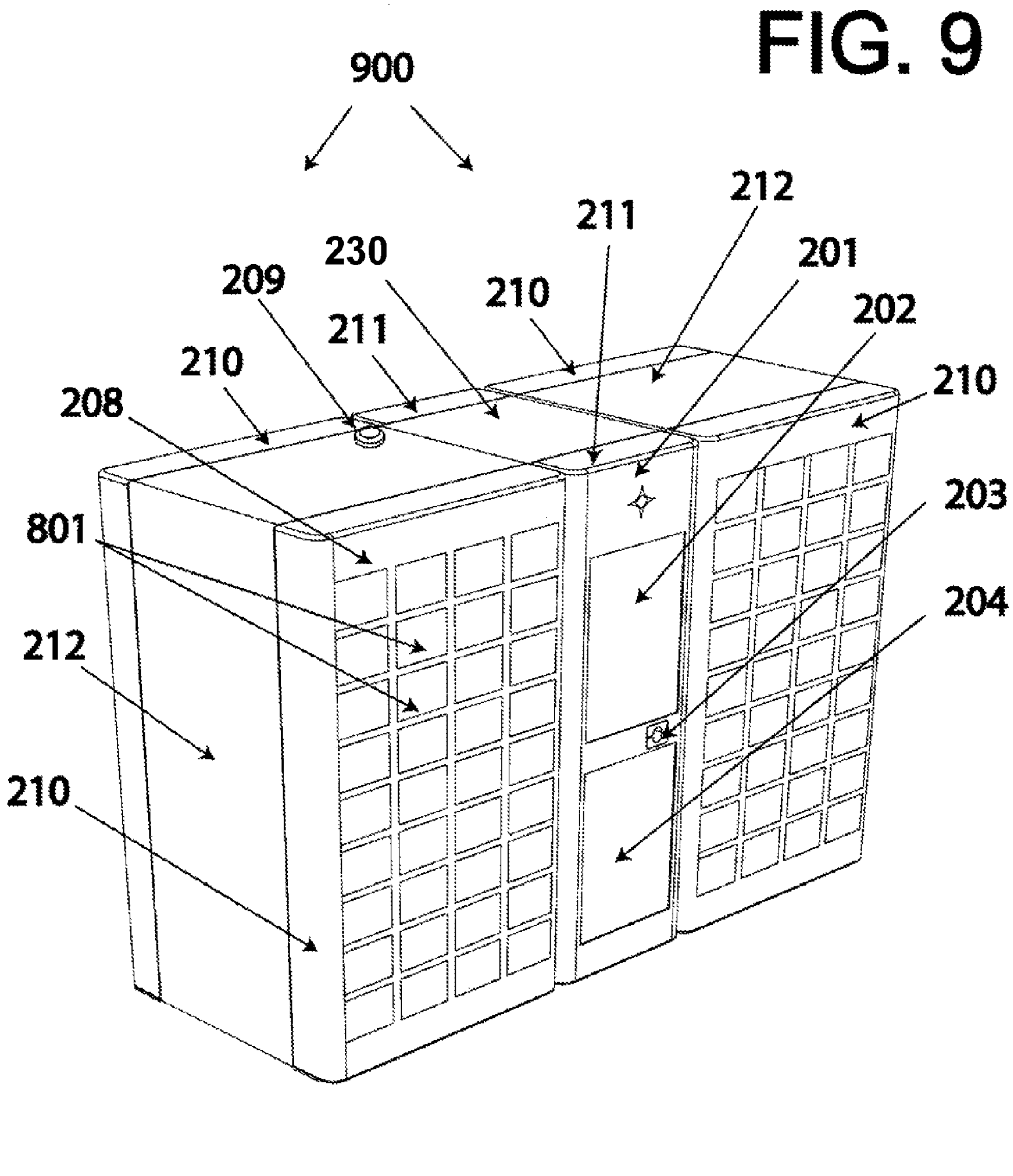
FIG. 9 is an isometric view of an assembled vending machine module configured for dual sided vending with two inventory cabinets.

With reference directed to FIG. 9, an alternative 900 (FIG. 9) shows an alternative configuration of the machine where it has been outfitted to dispense merchandise out of both the front and back of the machine. This machine has display modules 210 affixed to both sides of the inventory cabinet 212. It also has a vertical control panel 211 affixed to both sides of the central robotic gantry 230. This configuration allows the unit to serve two people at the same time.

Figure 10:
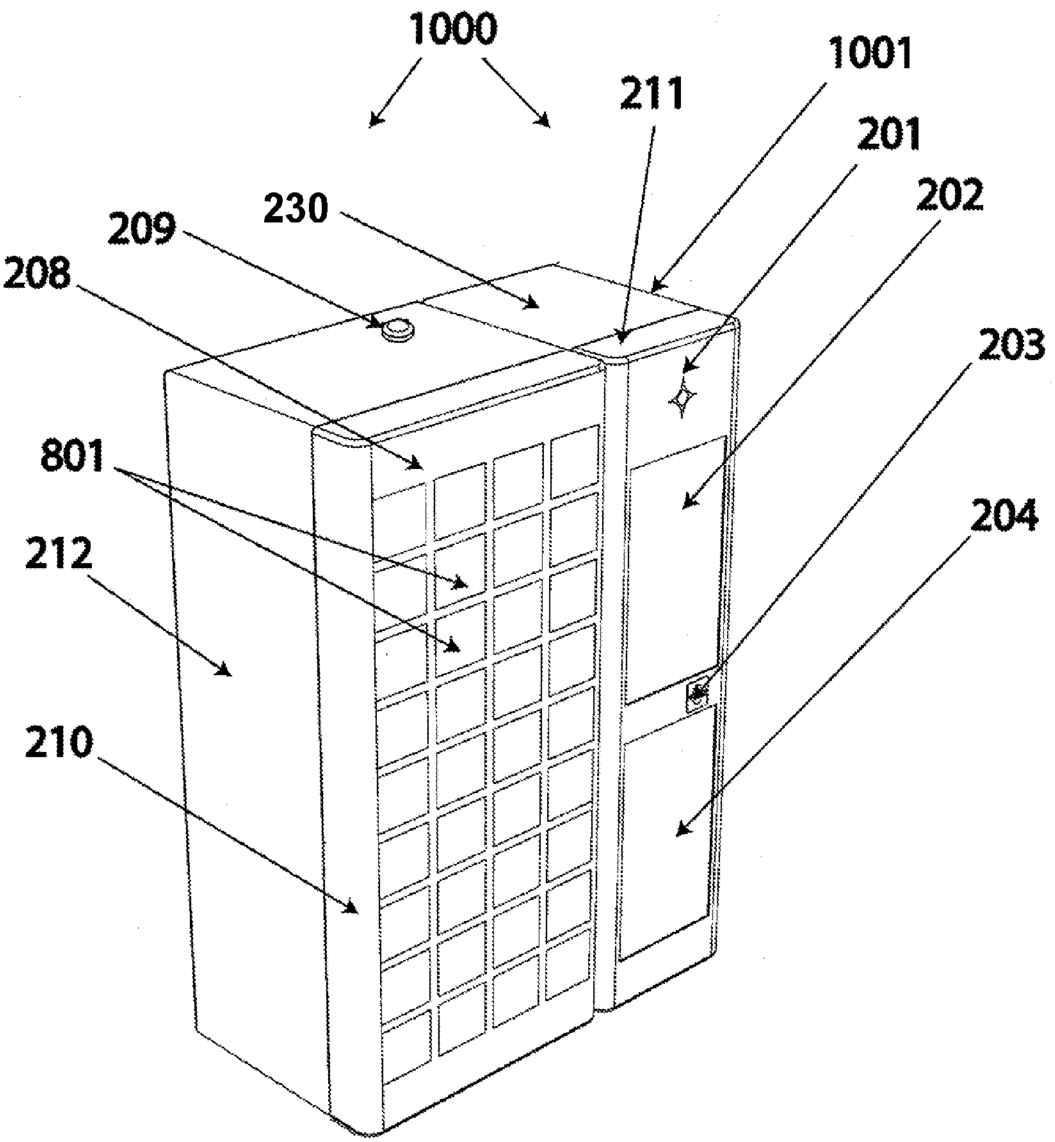
FIG. 10 is an isometric view of an assembled vending machine module with one attached inventory component.

With reference directed to FIG. 10, alternative machine 1000 represents a similar configuration but with only one inventory cabinet 212 and display module 210. These are once again attached to the common centralized robotic dispensing gantry 230. In this configuration a simple metal plate 1001 (not shown) cut the size of the dispensing system tower is affixed to the side where the inventory cabinet was attached in FIG. 8 using the same bolts to secure the system.

Figure 11:
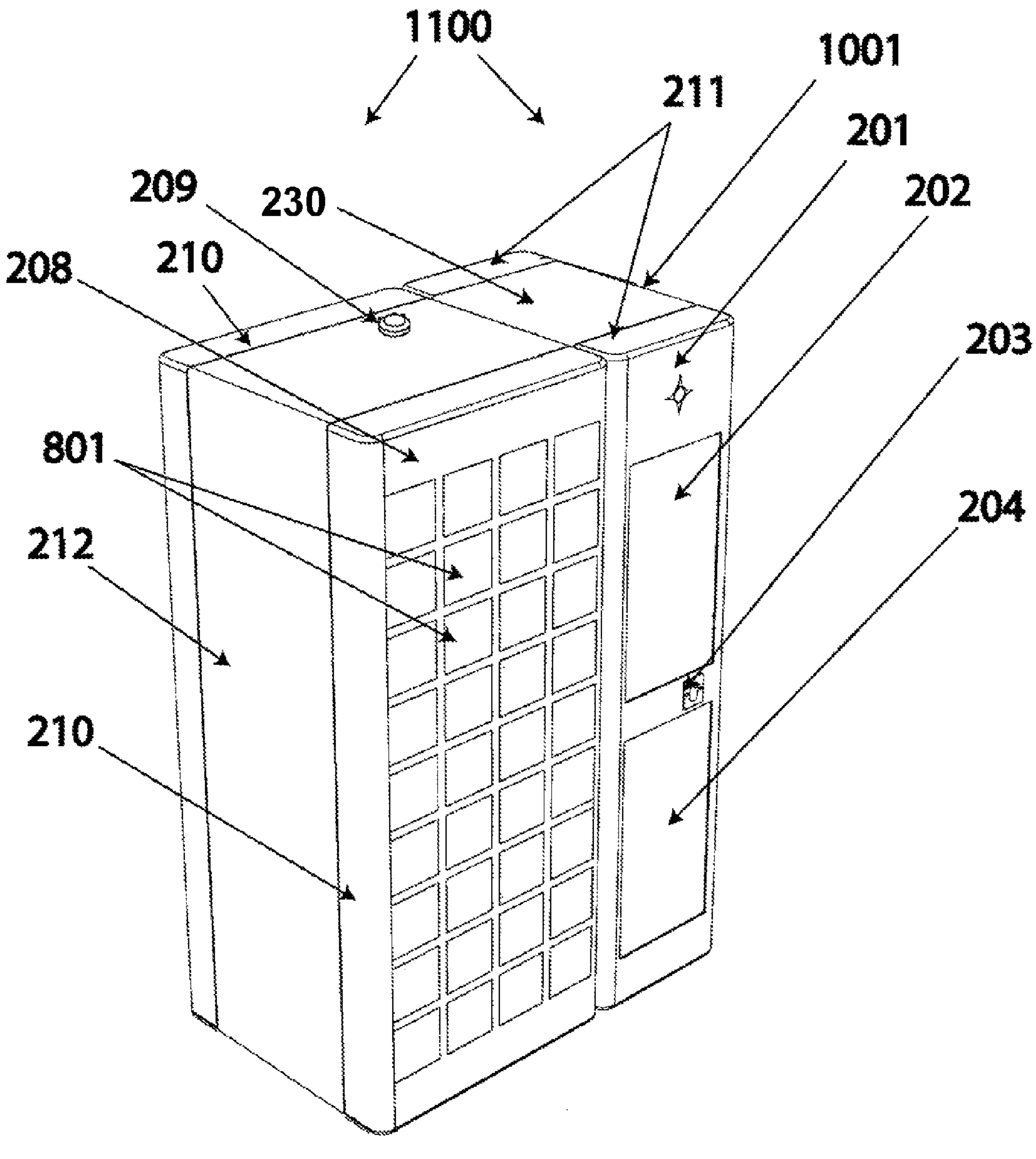
FIG. 11 is an isometric view of an assembled vending machine module configured for dual sided vending with one common inventory cabinet.

With reference directed to FIG. 11, another configuration of a vending machine 1100 utilizes the centralized robotic dispensing gantry 230 with one inventory cabinet and two display modules 210 and two vertical control panels 211. As in FIG. 9, this configuration allows for two users to simultaneously interact with the machine while using only one robotic dispensing mechanism and sharing a common inventory cabinet.

It will be understood that certain features and subcombinations are of utility and may be employed without reference to other features and subcombinations. This is contemplated by and is within the scope of the claims.

As many possible embodiments may be made of the present system without departing from the scope thereof, it is to be understood that all matter herein set forth or shown in the accompanying drawings is to be interpreted as illustrative and not in a limiting sense.

What is claimed is:

1. A customizable vending machine, retail display, or automated retail store comprising:

a central robotic gantry comprising an elevator vertically movable within the gantry, at least one door fitted upon the front or back of the gantry, the doors comprising a product vend area;

at least one inventory cabinet attached to at least one gantry side, the inventory cabinet comprising at least one dispensing module adjustably configurable to adjust the storage density of items to be vended, wherein the dispensing module comprises a conveyor and a plurality of dividers releasably couplable to the conveyor, wherein the conveyor comprises a plurality of conveyor slats, individual ones of the dividers are releasably coupled to individual ones of the conveyor slats, wherein individual ones of the dividers include a connection tab receivable in a connection slot in individual ones of the slats to releasably couple the dividers to the slats, wherein the connection tab includes a pair of outwardly biased prongs, the prongs including a first ramped surface to introduce the connection tab into the connection slot and a second ramped surface to releasably retain the connection tab in the connection slot;

at least one display module adjacent the gantry, the display module containing items to be vended, the display module comprising a plurality of physical displays in which items to be vended are visibly housed; and a computer for activating and controlling the gantry and said module; and, software for controlling said computer.

2. The vending machine as defined in claim 1 wherein dispensing module further comprises a stop switch; and at least one stop flag on individual ones of the dividers configured to activate the stop switch to indicate the conveyor had traveled a sufficient distant to dispense an item to be vended.

3. The vending machine as defined in claim 1 wherein the second ramped surface being configured at a steeper angle to the longitudinal axis of the connection tab than the first ramped surface.

4. The vending machine as defined in claim 1 wherein the dispensing module further comprising a ramp for dispensing items to be vended from the dispensing module to the gantry.

5. The vending machine as defined in claim 4 wherein the ramp include a plurality of forked fingers and individual ones of the dividers include forked tabs that pass between the forked fingers of the ramp as the conveyor travels to dispense items to be vended.

6. The vending machine as defined in claim 1 wherein the dispensing module further comprising: a drive system coupled to the conveyor, the drive system comprising a motor, a pulley system coupled to the motor, and a drive gear coupled to the pulley system and operably coupled to the conveyor.

7. The vending machine as defined in claim 1 further comprising: an inventory tray mounted in the inventory cabinet, the dispensing module releasably coupled to the inventory tray.

8. The vending machine as defined in claim 7 wherein the dispensing module includes a plurality of mounting hooks releasably received in mounting slots in the inventory tray.

9. A dispensing module for a modularized vending machine, retail display, or automated retail store having a robotic gantry, the dispensing module comprising:

a conveyor; and a plurality of dividers releasably couplable to the conveyor to adjustably configure the storage density of items to be vended, wherein the conveyor comprises a plurality of conveyor slats, individual ones of the dividers are releasably coupled to individual ones of the conveyor slats, wherein individual ones of the dividers include a connection tab receivable in a connection slot in individual ones of the slats to releasably couple the dividers to the slats, wherein the connection tab includes a pair of outwardly biased prongs, the prongs including a first ramped surface to introduce the connection tab into the connection slot and a second ramped surface to releasably retain the connection tab in the connection slot.

10. The dispensing module as defined in claim 9 further comprises a stop switch; and at least one stop flag on individual ones of the dividers configured to activate the stop switch to indicate the conveyor had traveled a sufficient distant to dispense an item to be vended.

11. The dispensing module as defined in claim 9 wherein the second ramped surface being configured at a steeper angle to the longitudinal axis of the connection tab than the first ramped surface.

12. The dispensing module as defined in claim 9 wherein the dispensing module further comprising a ramp for dispensing items to be vended from the dispensing module to the gantry.

13. The dispensing module as defined in claim 12 wherein the ramp includes a plurality of forked fingers and individual ones of the dividers include forked tabs that pass between the forked fingers of the ramp as the conveyor travels to dispense items to be vended.

14. The dispensing module as defined in claim 9 wherein the dispensing module further comprising: a drive system coupled to the conveyor, the drive system comprising a motor, a pulley system coupled to the motor, and a drive gear coupled to the pulley system and operably coupled to the conveyor.

* * * * *